United States Patent
Sreenivas et al.

(10) Patent No.: US 11,881,762 B2
(45) Date of Patent: Jan. 23, 2024

(54) METHOD AND APPARATUS FOR ADAPTIVE CONTROL OF REGULATION CONTROL PARAMETER

(71) Applicant: Infineon Technologies Austria AG, Villach (AT)

(72) Inventors: Venkat Sreenivas, Winchester, MA (US); Bikiran Goswami, Burlington, MA (US); Benjamim Tang, Rancho Palos Verdes, CA (US); Todd Bellefeuille, Georgetown, MA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 237 days.

(21) Appl. No.: 17/388,297

(22) Filed: Jul. 29, 2021

(65) Prior Publication Data
US 2023/0036457 A1    Feb. 2, 2023

(51) Int. Cl.
*H02M 1/32*      (2007.01)
*H02M 1/00*      (2006.01)
*H02M 1/15*      (2006.01)
*H02M 3/158*     (2006.01)

(52) U.S. Cl.
CPC .......... *H02M 1/32* (2013.01); *H02M 1/0019* (2021.05); *H02M 1/0025* (2021.05); *H02M 1/15* (2013.01); *H02M 3/1584* (2013.01)

(58) Field of Classification Search
CPC .... H02M 1/32; H02M 1/0025; H02M 1/0019; H02M 1/15; H02M 3/1584
See application file for complete search history.

(56) References Cited

U.S. PATENT DOCUMENTS

| 8,598,857 | B2 * | 12/2013 | Pierson | ............... H02M 3/1584 323/283 |
| 10,951,116 | B2 | 3/2021 | Liu et al. | |

(Continued)

FOREIGN PATENT DOCUMENTS

EP    3121948 A1    1/2017

OTHER PUBLICATIONS

European Search Report from Corresponding European Patent Application No. 22187156.9, dated Dec. 8, 2022, 8 pages.

*Primary Examiner* — Rafael O De Leon Domenech
(74) *Attorney, Agent, or Firm* — COOPER LEGAL GROUP, LLC

(57) ABSTRACT

An apparatus may include a regulated power converter, a control engine configured to control the regulated power converter based upon a regulation control parameter, and a parameter control system. The parameter control system may be configured to detect a transient event at an output of the regulated power converter. The parameter control system may be configured to modify, in response to the transient event, the regulation control parameter from a first value to a second value based upon a parameter modification profile. The parameter control system may be configured to modify, in response to modifying the regulation control parameter from the first value to the second value, the regulation control parameter according to a function of the parameter modification profile. The function may define a return of the regulation control parameter from the second value to the first value over a period of time.

20 Claims, 12 Drawing Sheets

(56) References Cited

U.S. PATENT DOCUMENTS

2008/0157743 A1* 7/2008 Martin ................ H02M 3/1584
323/284
2009/0121695 A1 5/2009 Pierson et al.
2023/0006556 A1* 1/2023 Sreenivas ........... H02M 3/1586

* cited by examiner

METHOD AND APPARATUS FOR ADAPTIVE CONTROL OF REGULATION CONTROL PARAMETER

TECHNICAL FIELD

The present disclosure relates to the field of regulated power conversion.

BACKGROUND

Various types of devices may utilize electric power converters that convert one form of electric energy to another, such as by changing a voltage of the electric energy. Some electric power converters are configured to regulate an output voltage and/or an output current at an output.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment, a method is provided. The method may comprise detecting a transient event at an output of a regulated power converter. The method may comprise modifying a regulation control parameter, of a control engine controlling the regulated power converter, according to a parameter modification profile. The modifying the regulation control parameter according to the parameter modification profile may be performed in response to detecting the transient event. The modifying the regulation control parameter according to the parameter modification profile may comprise modifying the regulation control parameter from a first value to a second value, and in response to modifying the regulation control parameter from the first value to the second value, modifying the regulation control parameter according to a function of the parameter modification profile, wherein the function defines a return of the regulation control parameter from the second value to the first value over a period of time.

In an embodiment, an apparatus is provided. The apparatus may comprise a means for detecting a transient event at an output of a regulated power converter. The apparatus may comprise a means for modifying a regulation control parameter, of a control engine controlling the regulated power converter, according to a parameter modification profile. The modifying the regulation control parameter according to the parameter modification profile may be performed in response to detecting the transient event. The modifying the regulation control parameter according to the parameter modification profile may comprise modifying the regulation control parameter from a first value to a second value, and in response to modifying the regulation control parameter from the first value to the second value, modifying the regulation control parameter according to a function of the parameter modification profile, wherein the function defines a return of the regulation control parameter from the second value to the first value over a period of time.

In an embodiment, an apparatus is provided. The apparatus may comprise a regulated power converter, a control engine configured to control the regulated power converter based upon a regulation control parameter, and a parameter control system. The parameter control system may be configured to detect a transient event at an output of the regulated power converter. The parameter control system may be configured to modify, in response to the transient event, the regulation control parameter from a first value to a second value based upon a parameter modification profile. The parameter control system may be configured to modify, in response to modifying the regulation control parameter from the first value to the second value, the regulation control parameter according to a function of the parameter modification profile. The function may define a return of the regulation control parameter from the second value to the first value over a period of time.

In an embodiment, an apparatus is provided. The apparatus may comprise a circuit board, a regulated power converter operatively coupled to the circuit board, a control engine operatively coupled to the circuit board, and a parameter control system operatively coupled to the circuit board. The control engine may be configured to control the regulated power converter based upon a regulation control parameter. The parameter control system may be configured to detect a transient event at an output of the regulated power converter. The parameter control system may be configured to modify, in response to the transient event, the regulation control parameter from a first value to a second value based upon a parameter modification profile. The parameter control system may be configured to modify, in response to modifying the regulation control parameter from the first value to the second value, the regulation control parameter according to a function of the parameter modification profile. The function may define a return of the regulation control parameter from the second value to the first value over a period of time.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
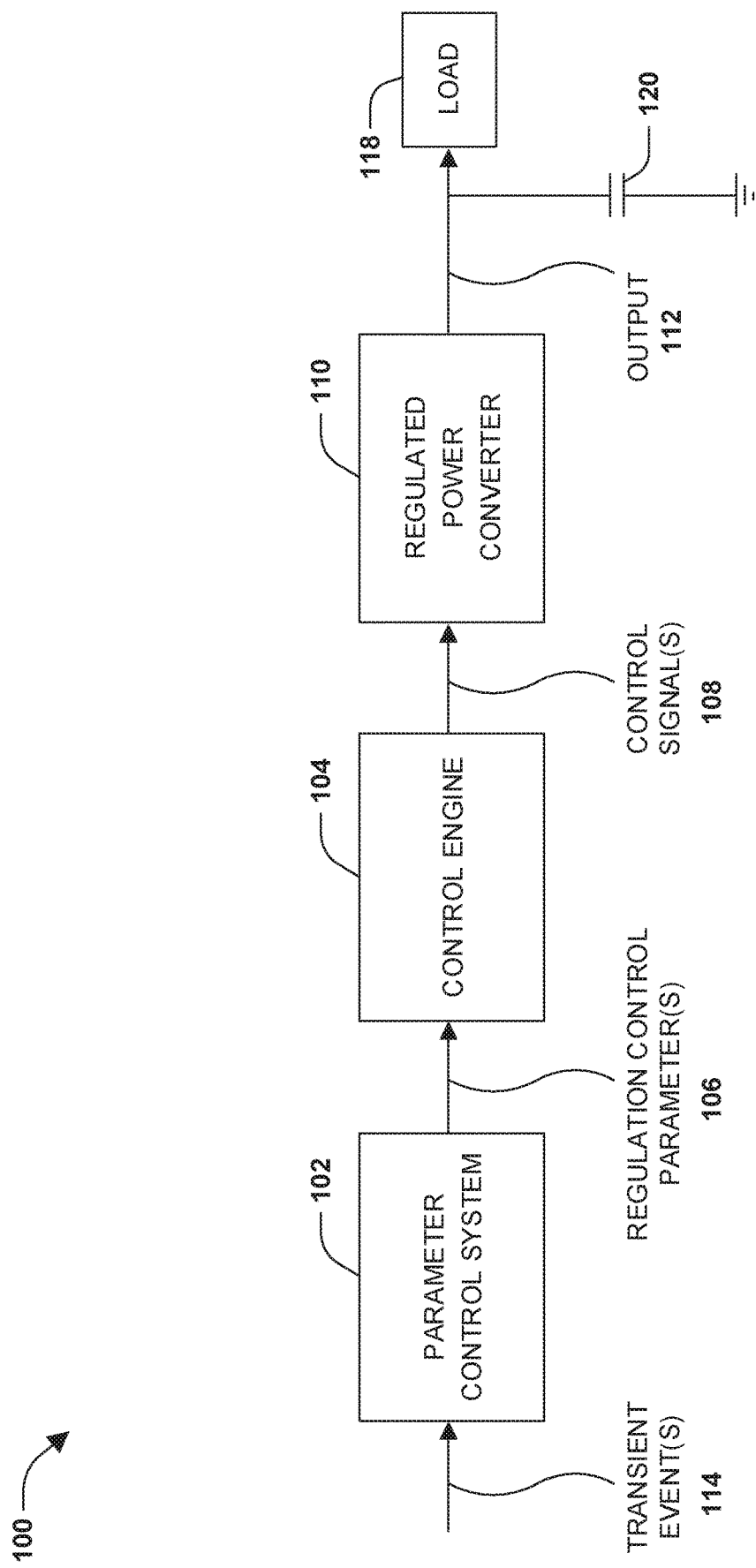
FIG. 1 is a component block diagram illustrating an exemplary apparatus with a parameter control system, a control engine and/or a regulated power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Within the field of electronics, a regulated power converter is used to convert one form of electric energy to another and/or regulate an output voltage and/or an output current at an output of the regulated power converter. In an embodiment, a control engine may be configured to control the regulated power converter to reduce a voltage error of the output voltage, such as a difference between the output voltage and a target voltage. One or more regulation control parameters of the control engine, based upon which the control engine controls the regulated power converter, may be adjusted based upon transient events at the output, such as load transients caused by load steps and/or load releases of a load connected to the output.

Some systems require frequency detectors that are used to determine whether a frequency of transient events at the output is within a frequency range, and to control regulation control parameters of the control engine based upon the frequency range. However, such frequency detectors are costly and require a large amount of space. Further, due to a time it takes for a frequency detector to determine and/or validate whether the frequency of transient events is within the frequency range, there may be a delay between a change in frequency and an adjustment to a regulation control parameter based upon the change in frequency. In these systems, a regulation control parameter may be set to a first value based upon a determination that the frequency of transient events is within a first frequency range (e.g., less than a first threshold frequency) and/or may be set to a second value based upon a determination that the frequency of transient events is within a second frequency range (e.g., higher than the first threshold frequency). Thus, using these systems, the regulation control parameter may be changed to different discrete values in a choppy and/or granular manner and/or adjustment of the regulation control parameter may be an abrupt change from the first value to the second value. In some implementations, more frequency detectors are employed to provide for more frequency ranges and/or more values to which the regulation control parameter can be changed. However, adding more frequency detectors requires higher costs and more space. Further, even when more frequency detectors are employed, the regulation control parameter is still changed in a choppy and/or granular manner.

The techniques and apparatuses provided herein are capable of controlling a regulation control parameter of the control engine adaptively based upon transient events at the output of the regulated power converter. In some embodiments, in response to a first transient event, the regulation control parameter may be modified according to a parameter modification profile. For example, the regulation control parameter may be modified from a first value (e.g., a base value of the regulation control parameter) to a second value. The second value to which the regulation control parameter is modified may be based upon (and/or indicated by) the parameter modification profile. In response to modifying the regulation control parameter from the first value to the second value, the regulation control parameter may be modified according to a function of the parameter modification profile, wherein the function defines a return of the regulation control parameter from the second value to the first value over a first period of time. The first period of time may be based upon a duration of time indicated by the parameter modification profile (e.g., the first period of time may have the duration of time). A cycle comprising modification of the regulation control parameter according to the parameter modification profile (e.g., a cycle comprising modification of the regulation control parameter from the first value to the second value and/or modification of the regulation control parameter from the second value to the first value according to the first function over the first period of time) may be referred to as a first profile-based knobbing cycle. A second profile-based knobbing cycle of the regulation control parameter according to the parameter modification profile may be started during (e.g., before completion of) the first profile-based knobbing cycle. The second profile-based knobbing cycle may be started in response to a second transient event that is detected before completion of the first profile-based knobbing cycle (e.g., a second transient event that is detected during the first period of time). Profile-based knobbing cycles of the regulation control parameter may be started in response to transient events. When a transient event frequency exceeds a threshold, a profile-based knobbing cycle of the regulation control parameter may be started prior to a preceding profile-based knobbing cycle of the regulation control parameter being completed (such as the second profile-based knobbing cycle being started before completion of the first profile-based knobbing cycle). Accordingly, using one or more of the techniques and/or apparatuses herein, a value of the regulation control parameter may vary with different transient event frequencies without requiring calculation of the transient event frequencies (and thus, without requiring frequency detectors, resulting in lower costs and less space as compared to systems that employ frequency detectors to control the regulation control parameter). Further, in comparison with systems that employ frequency detectors to control the regulation control parameter, value change of the regulation control parameter over time due to varying transient event frequencies may be smoother, and the regulation control parameter may be more quickly adjusted to respond to a change in transient event frequency, thereby resulting in improved performance of the control engine and/or the regulated power converter.

In an embodiment, an apparatus, comprising a regulated power converter, a control engine and/or a parameter control system, is provided. The parameter control system may be configured to output a regulation control parameter to the control engine. The control engine is configured to control the regulated power converter based upon the regulation control parameter. The regulated power converter may supply power, to a load, at an output of the regulated power converter. For example, the regulated power converter may control and/or regulate an output voltage and/or an output current at the output. In an embodiment, the regulated power converter may comprise a voltage regulator configured to control the output voltage at the output to match a target voltage and/or the regulated power converter may be configured to reduce a voltage error of the output voltage. The voltage error may correspond to a difference between the output voltage and a target voltage. The target voltage may be based upon the load. In some embodiments, the output is connected to a capacitor. The output voltage may correspond to a voltage of the capacitor.

In some embodiments, the parameter control system is configured to detect transient events at the output. A transient event detected by the parameter control system may correspond to a current increase at the output of the regulated power converter and/or an under-voltage event of the output of the regulated power converter (e.g., an under-voltage event may correspond to the output voltage decreasing to a voltage less than the target voltage). For example, the transient event (e.g., the current increase and/or the under-voltage event) may be caused by a load step of the load connected to the output of the regulated power converter. The load step may correspond to an increase in power consumption by the load, where the increase in power consumption may cause charge in the capacitor to discharge at a higher rate than prior to the load step (and thus may cause the under-voltage event, for example). The under-voltage event may correspond to an under-voltage event of the capacitor.

Alternatively and/or additionally, the transient event detected by the parameter control system may correspond to a current decrease at the output of the regulated power converter and/or an over-voltage event of the output of the regulated power converter (such as when the output voltage increases to a voltage higher than the target voltage). For example, the transient event (e.g., the current decrease and/or the over-voltage event) may be caused by a load release of the load. The load release may correspond to a decrease in power consumption by the load, where the decrease in power consumption may cause charge in the capacitor to discharge at a lower rate than prior to the load release (and thus may cause the over-voltage event, for example). The over-voltage event may correspond to an over-voltage event of the capacitor.

In some embodiments, in response to the transient event, the parameter control system starts a profile-based knobbing cycle of the regulation control parameter. The profile-based knobbing cycle is based upon (e.g., defined by) a parameter modification profile. The profile-based knobbing cycle comprises setting the regulation control parameter to a second value and/or modifying, according to a function of the parameter modification profile, the regulation control parameter from the second value to a first value over a first period of time. The first value may correspond to a base value of the regulation control parameter (and/or the first value may correspond to a value of the regulation control parameter when the regulation control parameter is not undergoing the profile-based knobbing cycle).

The parameter modification profile may be indicative of the second value. For example, the parameter modification profile may indicate the second value as a starting value of the profile-based knobbing cycle). Alternatively and/or additionally, the parameter modification profile may indicate that the regulation control parameter be set to the second value (e.g., modified from the first value to the second value) instantaneously upon starting the profile-based knobbing cycle of the regulation control parameter. In response to the transient event, the parameter control system may modify the regulation control parameter from a current value of the regulation control parameter (e.g., the first value or other value) to the second value (e.g., the parameter control system may modify the regulation control parameter from the current value to the second value at the beginning of the profile-based knobbing cycle).

The function of the parameter modification profile defines a return of the regulation control parameter from the second value to the first value over the first period of time. The first period of time may be based upon a first duration of time indicated by the parameter modification profile (e.g., a duration of the first period of time may be equal to the first duration of time). The function of the parameter modification profile may be at least one of a linear function, a piecewise function, a step function, an exponential decay function, etc.

In response to setting the regulation control parameter to the second value (at the beginning of the profile-based knobbing cycle, for example), the parameter control system may modify the regulation control parameter according to the function of the parameter modification profile. In an embodiment where a second transient event is not detected prior to completion of the profile-based knobbing cycle (and/or where a second transient event is not detected during the first period of time), the profile-based knobbing cycle of the regulation control parameter may be completed. The profile-based knobbing cycle is completed when the parameter control system completes modification of the regulation control parameter from the second value to the first value over the first period of time according to the first function.

Alternatively and/or additionally, a second transient event at the output of the regulated power converter may be detected. The second transient event may occur during the first period of time and/or prior to completion of the profile-based knobbing cycle. In response to detecting the second transient event, the parameter control system may start a second profile-based knobbing cycle of the regulation control parameter according to the parameter modification profile. For example, the parameter control system may start the second profile-based knobbing cycle prior to completion of the profile-based knobbing cycle (e.g., during the first period of time). Accordingly, in response to the second transient event, the parameter control system may set the regulation control parameter to the second value during the first period of time (e.g., the parameter control system may modify the regulation control parameter from a current value to the second value during the period of time, wherein the current value may be between the first value and the second value and/or the current value may be based on the function defining the return of the regulation control parameter from the second value to the first value over the first period of time) and/or the parameter control system may modify the regulation control parameter according to the function of the parameter modification profile (e.g., the function corresponding to a return from the second value to the first value over a second period of time, where a duration of the second period of time may be based upon and/or equal to the first duration of time indicated by the parameter modification profile).

In some examples, the parameter modification profile may be dynamically adjusted. For example, the second value and/or the function indicated by the parameter modification profile may be modified between profile-based knobbing cycles. In an example, the second value of the parameter modification profile may be modified such that the second value to which the regulation control parameter is set in the profile-based knobbing cycle is different than the second value to which the regulation control parameter is set in the second profile-based knobbing cycle following the profile-based knobbing cycle. Alternatively and/or additionally, the function of the parameter modification profile may be modified such that the function based upon which the regulation control parameter is modified in the profile-based knobbing cycle is different than the function based upon which the regulation control parameter is modified in the second profile-based knobbing cycle following the profile-based knobbing cycle.

In some embodiments, the parameter modification profile may be associated with (e.g., assigned to) a plurality of regulation control parameters of the control engine, wherein the plurality of regulation control parameters comprises the regulation control parameter. For example, the parameter control system may perform profile-based knobbing cycles of the plurality of regulation control parameters in accordance with the parameter modification profile. The plurality of regulation control parameters may comprise a second regulation control parameter. In some embodiments, in response to the transient event, the parameter control system may modify the second regulation control parameter in accordance with the parameter modification profile (such as using one or more of the techniques described herein with respect to modifying the regulation control parameter in accordance with the parameter modification profile in response to the transient event). Alternatively and/or additionally, for each regulation control parameter of the plurality of regulation control parameters, the parameter control system may modify the regulation control parameter in accordance with the parameter modification profile in response to a transient event.

In some embodiments, a second parameter modification profile, different than the parameter modification profile, may be associated with (e.g., assigned to) a third regulation control parameter. For example, the parameter control system may perform a profile-based knobbing cycle of the second regulation control parameter in accordance with the second parameter modification profile. In an example, in response to a transient event, the parameter control system may modify the second regulation control parameter in accordance with the second parameter modification profile.

In some embodiments, the apparatus comprises a circuit board, wherein the regulated power converter, the control engine, the parameter control system and/or the load are operatively coupled to the circuit board. The regulated power converter, the control engine and/or the parameter control system may be affixed to and/or fabricated on the circuit board.

In one embodiment, one or more first components of the apparatus may be affixed to and/or fabricated on a first circuit board and/or one or more second components may be affixed to and/or fabricated on a second circuit board. The second circuit board may be coupled to the first circuit board. For example, the second circuit board may be slotted into the first circuit board (e.g., the second circuit board may be coupled to the first circuit board via a slot, such as at least one of an expansion slot, an expansion port, etc.). In an example, the one or more first components may comprise the control engine and/or the parameter control system. The one or more second components may comprise the regulated power converter and/or the load.

FIG. 1 illustrates an apparatus 100 according to some embodiments. The apparatus 100 comprises a parameter control system 102, a control engine 104, and/or a regulated power converter 110. The parameter control system 102 may be configured to output one or more regulation control parameters 106 to the control engine 104. The control engine 104 is configured to control the regulated power converter 110 based upon the one or more regulation control parameters 106. For example, the control engine 104 may control the regulated power converter 110 using one or more control signals 108. The regulated power converter 110 may control and/or regulate an output voltage and/or an output current at an output 112 of the regulated power converter 110. In an embodiment, the regulated power converter 110 may comprise a voltage regulator configured to control the output voltage at the output to match a target voltage and/or the regulated power converter may be configured to reduce a voltage error of the output voltage. The voltage error may correspond to a difference between the output voltage and the target voltage. In some embodiments, the output 112 is connected to a capacitor 120. The output voltage may correspond to a voltage of the capacitor 120. The output 112 may be connected to a load 118 to which the regulated power converter 110 supplies power, for example.

In some embodiments, the parameter control system 102 may control and/or generate the one or more regulation control parameters 106 based upon a transient event signal 114. The transient event signal 114 may be indicative of occurrence of one or more transient events at the output 112. The transient event signal 114 may be received from the control engine 104, the regulated power converter 110, the output 112, and/or one or more other components. In some embodiments, in response to detecting a transient event at the output 112, the parameter control system 102 may modify a regulation control parameter of the one or more regulation control parameters 106 based upon a parameter modification profile. For example, in response to the transient event, the parameter control system 102 may set the regulation control parameter to a second value (e.g., the second value may be indicated by the parameter modification profile). In response to setting the regulation control parameter to the second value, the parameter control system 102 may modify the regulation control parameter according to a function of the parameter modification profile, wherein the function defines modification of the regulation control parameter from the second value to a first value over a period of time. In other words, in response to detecting a transient event at the output 112, the parameter control system 102 may set the regulation control parameter value to the second value and initiate a progressive return of the regulation control parameter from the second value to the first value using the variation profile defined by the function over the period of time. The first value may correspond to a base value of the regulation control parameter. The function may not be monotonic. In other words, the function may exhibit any variation profile between the second value and the first value. In some embodiments, the control engine 104 may adjust the one or more control signals 108 based upon the modification to the regulation control parameter to correct a voltage error at the output 112 associated with the transient event. In some embodiments, in response to detecting a transient event at the output 112 during the period of time during which the regulation control parameter is being returned from the second value to the first value using the function, the parameter control system 102 may set the regulation control parameter to the second value. In response to setting the regulation control parameter to the second value, the parameter control system 102 may modify the regulation control parameter according to the function which defines the modification of the regulation control parameter from the second value to the first value. In other words, if a transient event is detected during the period of time during which the regulation control parameter is being returned from the second value to the first value due to a previous transient even having been detected, the parameter control system 102 interrupts the return of the regulation control parameter to the first value, sets the regulation control parameter at the second value, and initiates the return of the parameter value from the second value to the first value once more (optionally, after the function has been modified).

Figure 2:
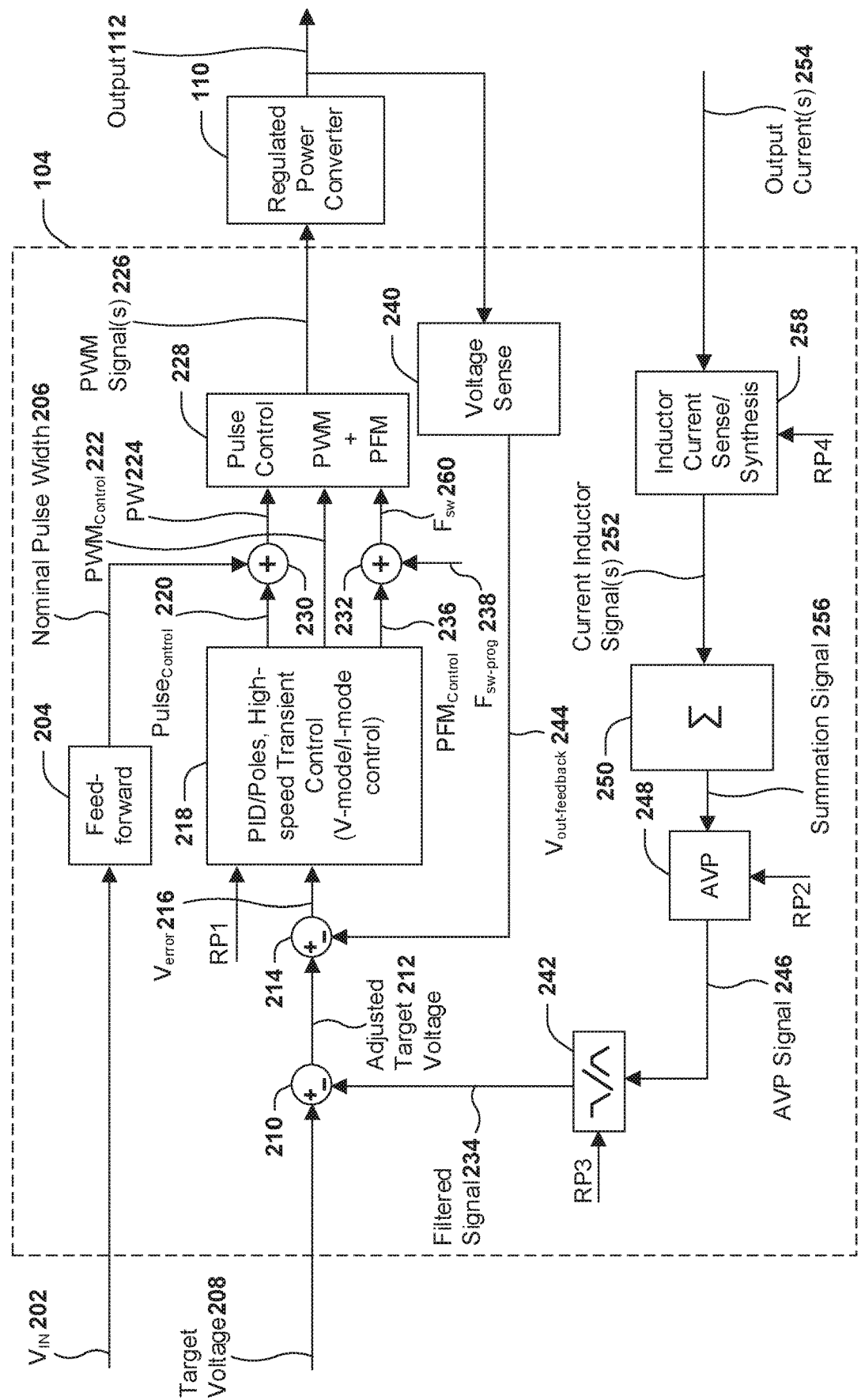
FIG. 2 is a component block diagram illustrating a control engine and/or a regulated power converter, according to some embodiments.

FIG. 2 illustrates the control engine 104, the regulated power converter 110 and/or the one or more regulation control parameters 106 (examples of which are shown with labels "RP1", "RP2", "RP3" and "RP4" in FIG. 2). In some embodiments, the regulated power converter 110 may comprise a voltage regulator, the control engine 104 may comprise a multi-phase buck control engine, and/or the one or more control signals 108 (output by the control engine 104 to the regulated power converter 110) may comprise a set of pulse width modulation (PWM) signals 226. The output voltage at the output 112 may be based upon the set of PWM signals 226.

In some embodiments, the regulated power converter 110 may comprise a multi-phase buck converter associated with a set of phases. The multi-phase buck converter may comprise a set of phase circuits configured to generate, based upon the set of PWM signals 226, the output voltage and/or the output current at the output 112. Each phase circuit of the set of phase circuits may be associated with a phase of the set of phases. Each PWM signal of the set of PWM signals may be associated with a phase of the set of phases (e.g., the PWM signal may control a phase circuit of the set of phase circuits associated with the phase). For example, each phase circuit of the set of phase circuits may comprise high side switch circuitry and/or low side switch circuitry controlled based upon a PWM signal of the set of PWM signals 226. Alternatively and/or additionally, each phase circuit of the set of phase circuits may comprise an inductor through which current is output (to the load 118, for example). Switching (e.g., controlled switching) of high side switch circuitry and low side switch circuitry of the set of phase circuits based upon the set of PWM signals may result in generation of the output voltage and/or the output current. In one embodiment, the regulated power converter 110 converts input voltage 202 to the output voltage at the output 112.

In some embodiments, a voltage error signal 216 may be generated based upon an output voltage feedback signal 244 output by a voltage monitor 240 (connected to the output 112, for example) and/or a target voltage signal 208 indicative of the target voltage of the regulated power converter 110. The output voltage feedback signal 244 may be indicative of the output voltage at the output 112 and/or other voltage determined using the output voltage.

In some embodiments, the control engine 104 comprises a current monitor 258 (e.g., an inductor current sense module and/or an inductor current synthesis module) configured to monitor output current 254 supplied by the regulated power converter 110, such as current supplied by each phase circuit of the set of phase circuits. For example, the control engine 104 may monitor (such as emulate, calculate, synthesize, measure, simulate, etc.) a respective amount of current supplied by each phase circuit of the set of phase circuits through respective inductors to the load 118.

The current monitor 258 is configured to generate one or more inductor current signals 252. In some embodiments, each inductor current signal of the one or more inductor current signals 252 is indicative of a magnitude of a current through an inductor of a phase circuit of the set of phase circuits. For example, a first inductor current signal of the one or more inductor current signals 252 may be indicative of a first current supplied by a first phase circuit of the set of phase circuits to the load 118, a second inductor current signal of the one or more inductor current signals 252 may be indicative of a second current supplied by a second phase circuit of the set of phase circuits to the load 118, etc.

In some embodiments, the control engine 104 comprises a combination module 250 (e.g., a summer module that performs a sum function) configured to sum the one or more inductor current signals 252 (e.g., sum the current magnitudes indicated by the one or more inductor current signals 252) and/or generate a summation signal 256 indicative of the sum. For example, the summation signal 256 may be indicative of a total magnitude of output current at the output 112 and/or supplied to the load 118.

In some embodiments, the control engine 104 comprises an adaptive voltage positioning (AVP) controller 248 configured to receive the summation signal 256 and/or generate an adaptive voltage feedback signal 246 (e.g., an AVP signal) based upon the summation signal 256. In some embodiments, the control engine 104 comprises an AVP filtering module 242 configured to receive the adaptive voltage feedback signal 246 and/or generate a filtered adaptive voltage feedback signal 234 based upon the adaptive voltage feedback signal 246. For example, noise may be filtered from the adaptive voltage feedback signal 246 to generate the filtered adaptive voltage feedback signal 234. In some embodiments, the filtered adaptive voltage feedback signal 234 is a target voltage adjustment signal used (by a combination module 210, for example) to generate an adjusted target voltage signal 212. For example, the combination module 210 (e.g., a subtractor module that performs a difference function) may generate the adjusted target voltage signal 212 based upon a difference between the target voltage signal 208 and the filtered adaptive voltage feedback signal 234. In one embodiment, the combination module 210 may output the adjusted target voltage signal 212 as equal to the target voltage signal 208 minus the filtered adaptive voltage feedback signal 234. In some embodiments, the voltage error signal 216 may be generated using a combination module 214 (e.g., a subtractor module that performs a difference function) based upon the output voltage feedback signal 244 and/or the adjusted target voltage signal 212. For example, the voltage error signal 216 may be based upon a difference between the output voltage feedback signal 244 and the adjusted target voltage signal 212. In one embodiment, the combination module 214 may output the voltage error signal 216 as equal to the adjusted target voltage signal 212 minus the output voltage feedback signal 244.

In some embodiments, the control engine 104 comprises a control module 218 comprising at least one of a transient module (e.g., a high speed transient module operating in transient operational mode), a controller (e.g., a Proportional Integral Derivative (PID) controller) comprising poles and/or other circuitry, etc. In some examples, the control module 218 may employ at least one of a current mode control (I-mode control) scheme, a voltage mode control (V-mode control) scheme, etc.

In some embodiments, the control module 218 receives the voltage error signal 216. The control module 218 may generate one or more signals based upon the voltage error signal 216. The one or more signals may comprise one or more pulse control signals 220, a PWM control signal 222 and/or a pulse frequency modulation (PFM) control signal 236. In an embodiment where the control module 218 comprises the transient module (e.g., the high speed transient module), the PFM control signal 236 is output by the transient module. For example, the transient module may generate the PFM control signal 236 based upon the voltage error signal 216. In some embodiments, the PFM control signal 236 is a switching frequency adjustment signal used (by a combination module 232, for example) to generate a switching frequency signal 260 ($F_{sw}$). For example, the combination module 232 (e.g., a summer module that performs a sum function) may generate the switching frequency signal 260 based upon a summation of the PFM control signal 236 and a nominal switching frequency signal 238. In one embodiment, the combination module 232 may output the switching frequency signal 260 as equal to the nominal switching frequency signal 238 plus the PFM control signal 236 (wherein the PFM control signal 236 may be positive or negative, for example).

In some embodiments, the control engine comprises a feed-forward module 204 configured to generate a nominal pulse width signal 206 based upon the input voltage 202. In one embodiment, the nominal pulse width signal 206 is indicative of a duty cycle value such as percentage value or other suitable value indicating a portion of a switching period to activate high side switch circuitry for each phase circuit of the set of phase circuits. Alternatively and/or additionally, the feed-forward module 204 may be configured to generate the nominal pulse width signal 206 based upon the target voltage signal 208 (e.g., the target voltage signal 208 may be input to the feed-forward module 204). In one embodiment, the nominal pulse width signal 206 is calculated as the target voltage signal 208 divided by the magnitude of the input voltage 202 being converted into the output voltage at the output 112.

One or more pulse width control information signals 224 may be generated based upon the nominal pulse width signal 206 and/or the one or more pulse control signals 220. For example, the one or more pulse width control information signals 224 may control a duty cycle (e.g., pulse width such as switch ON-time and switch OFF-time) of a corresponding switching period of a PWM signal of the set of PWM signals 226. In some embodiments, the one or more pulse width control information signals 224 may be generated using a combination module 230 (e.g., a subtractor module that performs a difference function) based upon the nominal pulse width signal 206 and/or the one or more pulse control signals 220. For example, a pulse width control information signal of the one or more pulse width control information signals 224 may be based upon a difference between the nominal pulse width signal 206 and a pulse control signal of the one or more pulse control signals 220 (wherein the pulse control signal is indicative of pulse width adjustment associated with a phase circuit of the set of phase circuits, and/or wherein a PWM signal of the set of PWM signals 226 is generated based upon the pulse width control information signal).

In some embodiments, the control engine 104 comprises a PWM generator 228 configured to receive the one or more pulse width control information signals 224, the PWM control signal 222 and/or the switching frequency signal 260. The PWM generator 228 may be configured to generate the set of PWM signals 226 based upon the one or more pulse width control information signals 224, the PWM control signal 222 and/or the switching frequency signal 260.

In some embodiments, operation of one or more components of the control engine 104 is based upon (and/or controlled by) the one or more regulation control parameters 106 (output by the parameter control system 102, for example). In some embodiments, the one or more regulation control parameters 106 comprise one or more first regulation control parameters RP1 input to the control module 218, one or more second regulation control parameters RP2 input to the AVP controller 248, one or more third regulation control parameters RP3 input to the AVP filtering module 242, one or more fourth regulation control parameters RP4 input to the current monitor 258, and/or one or more other regulation control parameters (not shown) input to one or more other components of the control engine.

In an embodiment, the one or more first regulation control parameters RP1 may comprise at least one of one or more non-linear gain parameters of the control module 218, one or more PID parameters (e.g., one or more linear PID parameters) of the PID controller of the control module 218, etc. The control module 218 may generate the one or more pulse control signals 220, the PWM control signal 222 and/or the PFM control signal 236 based upon the one or more first regulation control parameters RP1. Alternatively and/or additionally, the one or more second regulation control parameters RP2 may comprise an AVP droop level of the AVP controller 248. The AVP controller 248 may generate the adaptive voltage feedback signal 246 based upon the one or more second regulation control parameters RP2. Alternatively and/or additionally, the one or more third regulation control parameters RP3 may comprise an AVP bandwidth of the AVP filtering module 242. The AVP filtering module 242 may generate the filtered adaptive voltage feedback signal 234 based upon the one or more third regulation control parameters RP3. Alternatively and/or additionally, the one or more fourth regulation control parameters RP4 may comprise an inductor current synthesis parameter of the current monitor 258. The current monitor 258 may generate the one or more inductor current signals 252 based upon the one or more fourth regulation control parameters RP4. For example, the current monitor 258 may synthesize a magnitude of a current supplied by a phase circuit of the set of phase circuits based upon the inductor current synthesis parameter, wherein an inductor current signal of the one or more inductor current signals 252 is indicative of the magnitude of the current. In an embodiment, the one or more regulation control parameters 106 comprise an output voltage offset parameter (e.g., v lift), a control current boost parameter and/or a frequency boost parameter.

Figure 3:
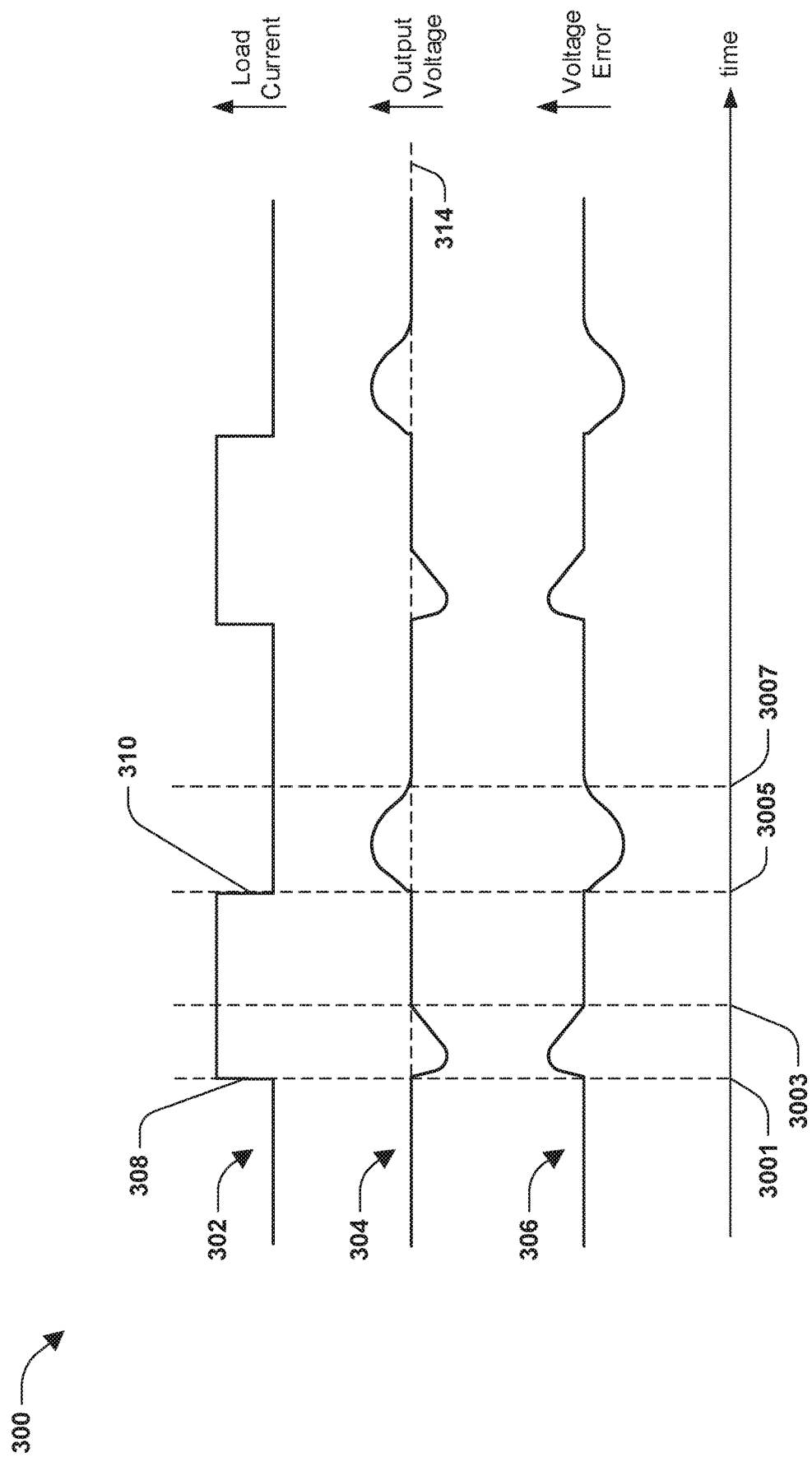
FIG. 3 is an exemplary timing diagram illustrating operation of an apparatus, according to some embodiments.

FIG. 3 illustrates a timing diagram 300 associated with operation of the apparatus 100, according to some embodiments. The timing diagram 300 comprises a load curve 302, an output voltage curve 304 and a voltage error curve 306. A horizontal axis of the timing diagram 300 may correspond to time. A vertical axis of the load curve 302 may correspond to current of the load 118. A vertical axis of the output voltage curve 304 may correspond to the output voltage at the output 112. A vertical axis of the voltage error curve 306 may correspond to a voltage level of the voltage error, such as indicated by the voltage error signal 216. The voltage error may correspond to a difference between the output voltage (represented by the output voltage curve 304, for example) and a target voltage 314 (shown with a dashed line in the timing diagram 300).

As shown by the load curve 302, one or more load steps and/or one or more load releases may occur. For example, a load step 308 may occur at a first time 300₁ and/or a load release 310 may occur at a third time 300₅. In some examples, the load step 308 may correspond to an increase in current of the load (such as due to the load 118 performing a task requiring increased power consumption). An under-voltage event may occur between the first time 300₁ and a second time 300₃. The under-voltage event may be caused by the load step 308. For example, the increase in current of the load 118 may cause charge in the capacitor 120 to discharge at a higher rate than prior to the load step 308 and/or may cause the output voltage to decrease (such as shown by the output voltage curve 304). The apparatus 100 may operate to increase the output voltage and/or reduce the voltage error (such as by adjusting the one or more control signals 112 to respond to the decrease of the output voltage). For example, the output voltage may be increased to about the target voltage 314 (and/or the voltage error may be reduced to about 0) at the second time 3003.

In some examples, a first transient event comprising the under-voltage event may be detected. The first transient event may be detected based upon the output voltage and/or the voltage error. The first transient event may be detected based upon a determination that the output voltage decreases to lower than a first threshold output voltage (and/or the voltage error increases to higher than a first threshold voltage error) during the under-voltage event. For example, if the output voltage does not decrease to lower than the first threshold output voltage (and/or if the voltage error does not increase to higher than the first threshold voltage error), the under-voltage event may be considered to be a steady state event (rather than a transient event). Alternatively and/or additionally, the first transient event may be detected based upon a determination that a slope of the output voltage decreases to lower than a first threshold output voltage slope (and/or a slope of the voltage error increases to higher than a first threshold voltage error slope) during the under-voltage event. For example, if the slope of the output voltage does not decrease to lower than the first threshold output voltage slope (and/or if the slope of the voltage error does not increase to higher than the first threshold voltage error slope), the under-voltage event may be considered to be a steady state event (rather than a transient event). Alternatively and/or additionally, the first transient event may be detected based upon a determination that the output voltage decreases to lower than the first threshold output voltage and the slope of the output voltage decreases to lower than the first threshold output voltage slope during the under-voltage event. Alternatively and/or additionally, the first transient event may be detected based upon a determination that the voltage error increases to higher than the first threshold voltage error and the slope of the voltage error increases to higher than the first threshold voltage error slope during the under-voltage event.

In the timing diagram 300 shown in FIG. 3, the voltage error may increase when the output voltage decreases (e.g., the voltage error may correspond to the target voltage 314 subtracted by the output voltage). However, in some embodiments, the voltage error may decrease when the output voltage decreases (e.g., the voltage error may correspond to the output voltage subtracted by the target voltage 314). In embodiments in which the voltage error decreases when the output voltage decreases, the first transient event may be detected based upon a determination that the voltage error decreases to lower than a second threshold voltage error during the under-voltage event. Alternatively and/or additionally, in embodiments in which the voltage error decreases when the output voltage decreases, the first transient event may be detected based upon a determination that the slope of the voltage error decreases to lower than a second threshold voltage error slope.

In some examples, the first transient event may trigger (the parameter control system to perform, for example) one or more profile-based knobbing cycles of one or more first regulation control parameters of the one or more regulation control parameters 106. In some examples, the one or more profile-based knobbing cycles may be started and/or triggered at the same time or at different times. In some examples, a profile-based knobbing cycle of a regulation control parameter of the one or more first regulation control parameters may be started and/or triggered at least one of at a beginning of the under-voltage event (e.g., at the first time 3001), at an end of the under-voltage event (e.g., at the second time 3003), at a time at which the first transient event comprising the under-voltage event is detected, at a time at which the output voltage reaches the first threshold output voltage, at a time at which the voltage error reaches the first threshold voltage error (or the second threshold voltage error), at a time at which the slope of the output voltage reaches the first threshold output voltage slope, at a time at which the slope of the voltage error reaches the first threshold voltage error slope (or the second threshold voltage error slope), etc. Alternatively and/or additionally, a profile-based knobbing cycle of a regulation control parameter of the one or more first regulation control parameters may be started and/or triggered based upon a time offset. For example, the profile-based knobbing cycle may be triggered and/or started once the time offset has passed from at least one of the beginning of the under-voltage event (e.g., at the first time 3001), the end of the under-voltage event (e.g., at the second time 3003), the time at which the first transient event comprising the under-voltage event is detected, the time at which the output voltage reaches the first threshold output voltage, the time at which the voltage error reaches the first threshold voltage error (or the second threshold voltage error), the time at which the slope of the output voltage reaches the first threshold output voltage slope, the time at which the slope of the voltage error reaches the first threshold voltage error slope (or the second threshold voltage error slope), etc. In an example where the one or more profile-based knobbing cycles of the one or more first regulation control parameters are started and/or triggered at different times, at least one of a first profile-based knobbing cycle of a first regulation control parameter of the one or more first regulation control parameters may be started and/or triggered at (and/or in response to) the beginning of the under-voltage event, a second profile-based knobbing cycle of a second regulation control parameter of the one or more first regulation control parameters may be started and/or triggered at (and/or in response to) the end of the under-voltage event, a third profile-based knobbing cycle of a third regulation control parameter of the one or more first regulation control parameters may be started and/or triggered based upon a time offset (such as started and/or triggered once the time offset passed from the time at which the voltage error increases to higher than the first threshold voltage error or decreases to lower than the second threshold voltage error), etc.

In some examples, the load release 310 may correspond to a decrease in current of the load 118. In an example, the load 118 may comprise a processor (e.g., a server processor) and/or the decrease in current may be due to the processor finishing a task. An over-voltage event may occur between the third time 3005 and a fourth time 3007. The over-voltage event may be caused by the load release 310. For example, the decrease in current of the load 118 may cause charge in the capacitor 120 to discharge at a lower rate than prior to the load release 310 and/or may cause the output voltage to increase (such as shown by the output voltage curve 304). The apparatus 100 may operate to reduce the output voltage and/or reduce a magnitude of the voltage error (such as by adjusting the one or more control signals 112 to respond to the increase of the output voltage). For example, the output voltage may be reduced to about the target voltage 314 (and/or the voltage error may be increased to about 0) at the fourth time 3007.

In some examples, a second transient event comprising the over-voltage event may be detected. The second transient event may be detected based upon the output voltage and/or the voltage error. The second transient event may be detected based upon a determination that the output voltage increases to higher than a second threshold output voltage (and/or the voltage error decreases to lower than a third threshold voltage error) during the over-voltage event. For example, if the output voltage does not increase to higher than the second threshold output voltage (and/or if the voltage error does not decrease to lower than the third threshold voltage error), the over-voltage event may be considered to be a steady state event (rather than a transient event). Alternatively and/or additionally, the second transient event may be detected based upon a determination that the slope of the output voltage increases to higher than a second threshold output voltage slope (and/or the slope of the voltage error decreases to lower than a third threshold voltage error slope) during the over-voltage event. For example, if the slope of the output voltage does not increase to higher than the second threshold output voltage slope (and/or if the slope of the voltage error does not decrease to lower than the third threshold voltage error slope), the over-voltage event may be considered to be a steady state event (rather than a transient event). Alternatively and/or additionally, the second transient event may be detected based upon a determination that the output voltage increases to higher than the second threshold output voltage and the slope of the output voltage increases to higher than the second threshold output voltage slope during the over-voltage event. Alternatively and/or additionally, the second transient event may be detected based upon a determination that the voltage error decreases to lower than the third threshold voltage error and the slope of the voltage error decreases to lower than the third threshold voltage error slope during the over-voltage event.

In the timing diagram 300 shown in FIG. 3, the voltage error may decrease when the output voltage increases (e.g., the voltage error may correspond to the target voltage 314 subtracted by the output voltage). However, in some embodiments, the voltage error may increase when the output voltage increases (e.g., the voltage error may correspond to the output voltage subtracted by the target voltage 314). In embodiments in which the voltage error increases when the output voltage increases, the second transient event may be detected based upon a determination that the voltage error increases to higher than a fourth threshold voltage error during the over-voltage event. Alternatively and/or additionally, in embodiments in which the voltage error increases when the output voltage increases, the second transient event may be detected based upon a determination that the slope of the voltage error increases to higher than a fourth threshold voltage error slope.

In some examples, the second transient event may trigger (the parameter control system to perform, for example) one or more profile-based knobbing cycles of one or more second regulation control parameters of the one or more regulation control parameters 106. In some examples, the one or more profile-based knobbing cycles may be started and/or triggered at the same time or at different times. In some examples, a profile-based knobbing cycle of a regulation control parameter of the one or more second regulation control parameters may be started and/or triggered at least one of at a beginning of the over-voltage event (e.g., at the third time 3005), at an end of the over-voltage event (e.g., at the fourth time 3007), at a time at which the second transient event comprising the over-voltage event is detected, at a time at which the output voltage reaches the second threshold output voltage, at a time at which the voltage error reaches the third threshold voltage error (or the fourth threshold voltage error), at a time at which the slope of the output voltage reaches the second threshold output voltage slope, at a time at which the slope of the voltage error reaches the third threshold voltage error slope (or the fourth threshold voltage slope), etc. Alternatively and/or additionally, a profile-based knobbing cycle of a regulation control parameter of the one or more second regulation control parameters may be started and/or triggered based upon a time offset. For example, the profile-based knobbing cycle may be triggered and/or started once the time offset has passed from at least one of the beginning of the over-voltage event (e.g., at the third time 3005), the end of the over-voltage event (e.g., at the fourth time 3007), the time at which the second transient event comprising the over-voltage event is detected, the time at which the output voltage reaches the second threshold output voltage, the time at which the voltage error reaches the third threshold voltage error (or the fourth threshold voltage error), the time at which the slope of the output voltage reaches the second threshold output voltage slope, the time at which the slope of the voltage error reaches the third threshold voltage error slope (or the fourth threshold voltage error slope), etc.

In some embodiments, profile-based knobbing cycles of a regulation control parameter of the one or more regulation control parameters 106 may not be started and/or triggered in response to both transient events comprising under-voltage events (e.g., the first transient event) and transient events comprising over-voltage events (e.g., the second transient event). For example, profile-based knobbing cycles of a regulation control parameter may be started and/or triggered in response to either transient events comprising under-voltage events (e.g., the first transient event) or transient events comprising over-voltage events. Alternatively and/or additionally, a regulation control parameter of the one or more regulation control parameters 106 may not be included in both the one or more first regulation control parameters (for which profile-based knobbing cycles may be started and/or triggered in response to transient events comprising under-voltage events) and the one or more second regulation control parameters (for which profile-based knobbing cycles may be started and/or triggered in response to transient events comprising over-voltage events).

Alternatively and/or additionally, in some embodiments, profile-based knobbing cycles of a regulation control parameter of the one or more regulation control parameters 106 may be started and/or triggered in response to both transient events comprising under-voltage events (e.g., the first transient event) and transient events comprising over-voltage events (e.g., the second transient event).

Figure 4:
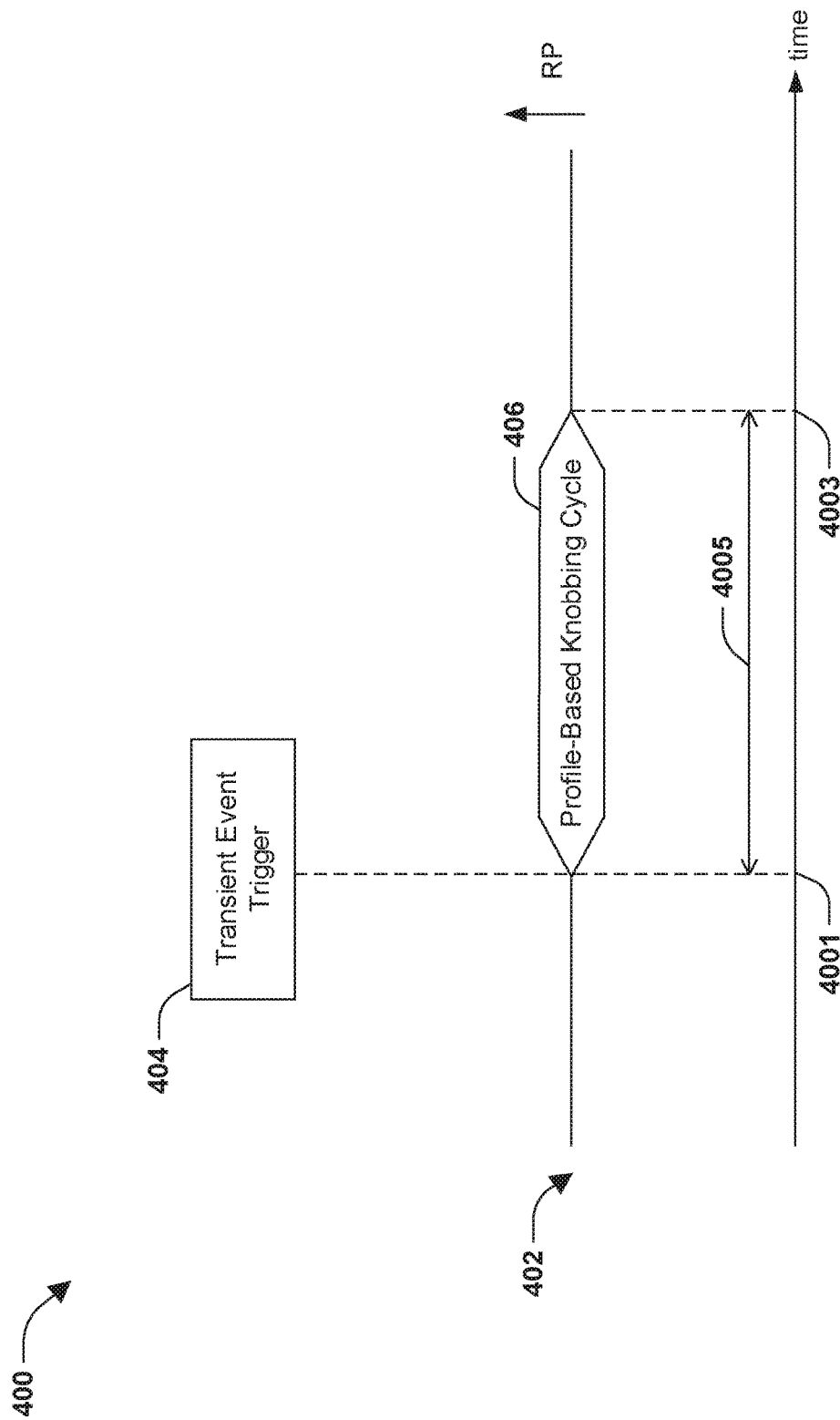
FIG. 4 is an exemplary timing diagram illustrating operation of an apparatus, according to some embodiments.

FIG. 4 illustrates a timing diagram 400 associated with operation of the apparatus 100, according to some embodiments. The timing diagram 400 comprises a regulation control parameter curve 402. A vertical axis of the regulation control parameter curve 402 may correspond to a regulation control parameter (e.g., a value of the regulation control parameter) of the one or more regulation control parameters 106. A profile-based knobbing cycle 406 of the regulation control parameter may be triggered 404 at a first time 4001 in response to a transient event. The profile-based knobbing cycle 406 may start at the first time 4001. The profile-based knobbing cycle 406 is based upon (e.g., defined by) a parameter modification profile. The profile-based knobbing cycle 406 comprises modification of the regulation control parameter, according to the parameter modification profile, over a period of time 4005 between the first time 4001 and a second time 4003 (wherein a duration of the period of time 4005 is based upon the parameter modification profile, for example).

Figure 5:
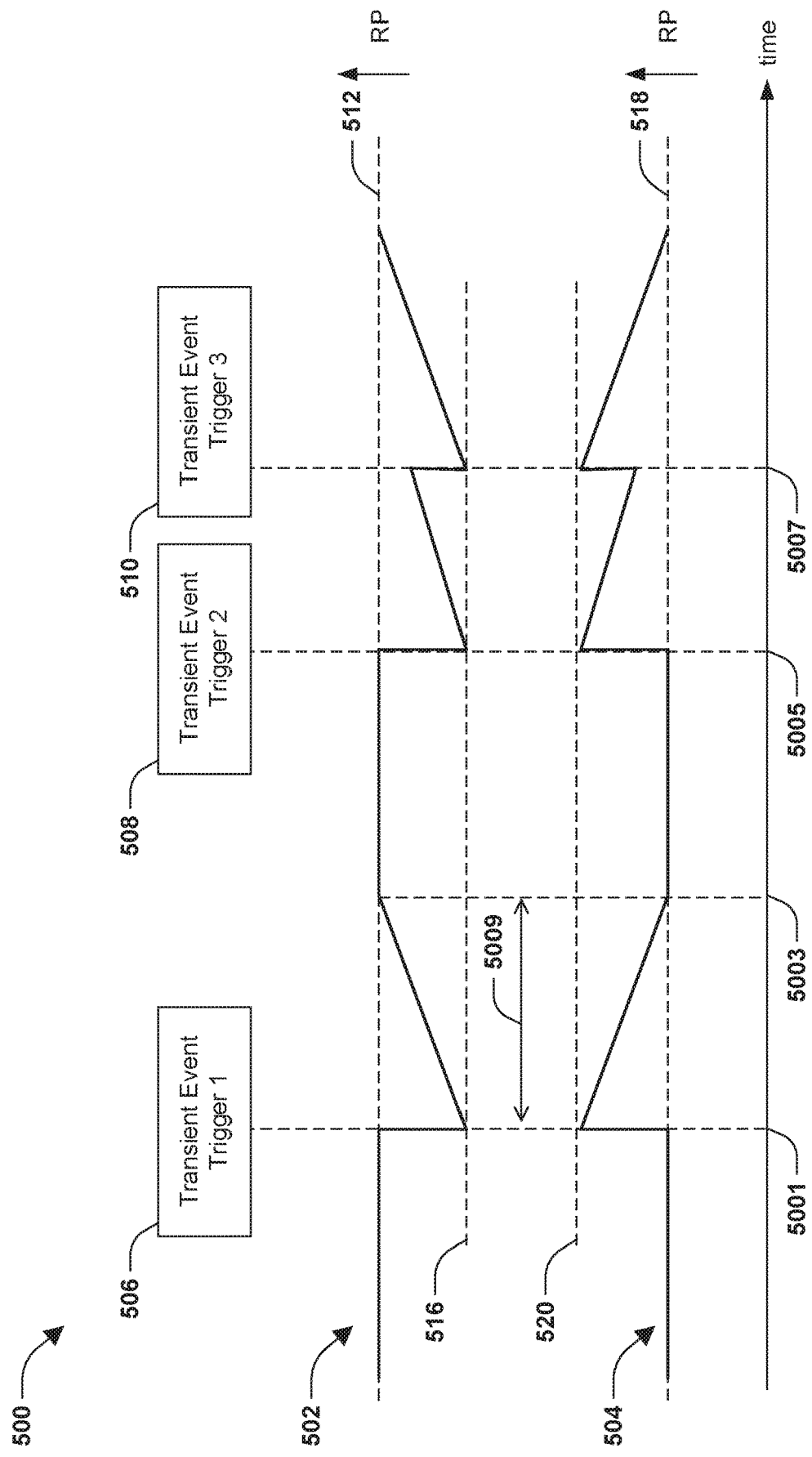
FIG. 5 is an exemplary timing diagram illustrating operation of an apparatus, according to some embodiments.

FIG. 5 illustrates a timing diagram 500 associated with operation of the apparatus 100, according to some embodiments. The timing diagram 500 comprises a first regulation control parameter curve 502 and a second regulation control parameter curve 504. A vertical axis of the first regulation control parameter curve 502 may correspond to a first regulation control parameter (e.g., a value of the first regulation control parameter) of the one or more regulation control parameters 106. A first profile-based knobbing cycle of the first regulation control parameter may be triggered 506 at a first time 5001 in response to a transient event. The first profile-based knobbing cycle may start at the first time 5001. The first profile-based knobbing cycle is based upon (e.g., defined by) a first parameter modification profile. The first profile-based knobbing cycle comprises setting the first regulation control parameter to a second value 516 (e.g., the second value 516 may be indicated by the parameter modification profile) and/or modification of the regulation control parameter, according to a first function of the first parameter modification profile, over a first period of time 5009 (wherein a duration of the first period of time 5009 is based upon the first parameter modification profile, for example). In some embodiments, the first function defines a return of the first regulation control parameter from the second value 516 to a base value 512 of the first regulation control parameter. The second value 516 may be lower than the base value 512. In some embodiments, such as shown in FIG. 5, the first function may be a linear function corresponding to a linear return of the first regulation control parameter from the second value 516 to the base value 512. In some embodiments, such as illustrated by the first regulation control parameter curve 702, the linear function may have a positive slope. In some embodiments, the first profile-based knobbing cycle is completed at a second time 5003 (e.g., the second time 5003 may correspond to the end of the first period of time 5009 and/or a time at which the first regulation control parameter reaches the base value 512). In some embodiments, a second profile-based knobbing cycle of the first regulation control parameter may be triggered 508 at a third time 5005 in response to a transient event. The second profile-based knobbing cycle may start at the third time 5005. The second profile-based knobbing cycle is based upon (e.g., defined by) the first parameter modification profile. The second profile-based knobbing cycle comprises setting the first regulation control parameter to the second value 516 (e.g., modifying the first regulation control parameter from the base value 512 to the second value 516) and/or modification of the regulation control parameter, according to the first function, over a second period of time (wherein a duration of the second period of time is the same as the duration of the first period of time 5009, for example). A third profile-based knobbing cycle may be triggered 510 at a fourth time 5007 that is during the second period of time (e.g., the fourth time 5007 is before the second profile-based knobbing cycle is completed and/or before the regulation control parameter reaches the base value 512). The third profile-based knobbing cycle may start at the fourth time 5007. The third profile-based knobbing cycle is based upon (e.g., defined by) the first parameter modification profile. The third profile-based knobbing cycle comprises setting the first regulation control parameter to the second value 516 (e.g., modifying the first regulation control parameter from a current value when the third profile-based knobbing cycle is triggered to the second value 516) and/or modification of the regulation control parameter, according to the first function, over a third period of time (wherein a duration of the third period of time is the same as the duration of the first period of time 5009, for example).

It may be appreciated that the second value may be higher than the base value. For example, in FIG. 5, the second regulation control parameter curve 504 illustrates the first regulation control parameter according to an example scenario in which the second value (shown with reference number 520) is higher than the base value (shown with reference number 518) and the first function (e.g., the linear function) of the profile modification profile has a negative slope.

Figure 6:
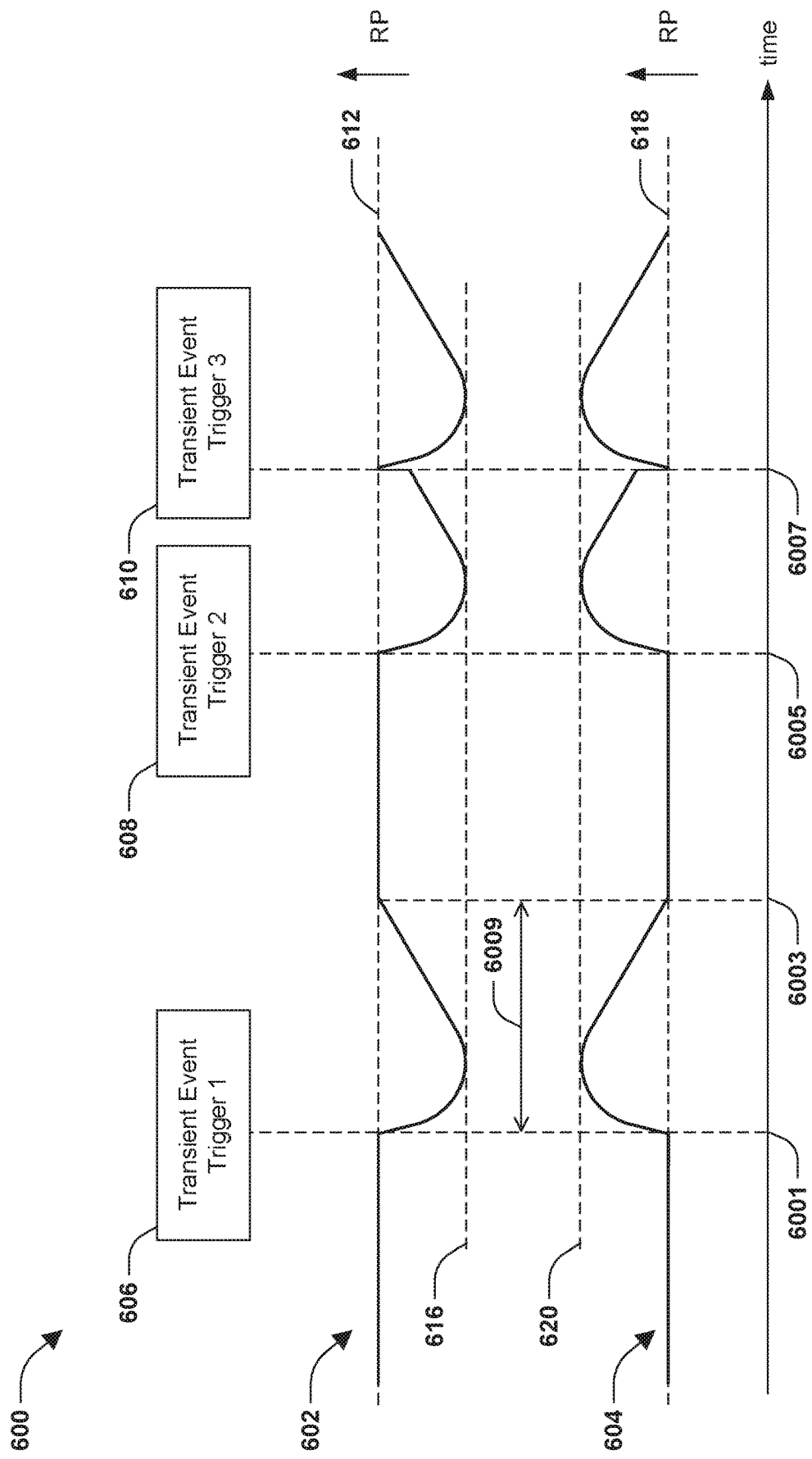
FIG. 6 is an exemplary timing diagram illustrating operation of an apparatus, according to some embodiments.

FIG. 6 illustrates a timing diagram 600 associated with operation of the apparatus 100, according to some embodiments. The timing diagram 600 comprises a first regulation control parameter curve 602 and a second regulation control parameter curve 604. A vertical axis of the first regulation control parameter curve 602 may correspond to a first regulation control parameter (e.g., a value of the first regulation control parameter) of the one or more regulation control parameters 106. A first profile-based knobbing cycle of the first regulation control parameter may be triggered 606 at a first time 6001 in response to a transient event. The first profile-based knobbing cycle may start at the first time 6001. The first profile-based knobbing cycle is based upon (e.g., defined by) a first parameter modification profile. The first profile-based knobbing cycle comprises modification of the regulation control parameter, according to a first function of the first parameter modification profile, over a first period of time 6009 (wherein a duration of the first period of time 6009 is based upon the first parameter modification profile, for example). In some embodiments, the first function defines modification of the first regulation control parameter over the first period of time 6009 ending with a base value 612 of the first regulation control parameter. For example, the first function may define modification of the first regulation control parameter from the base value 612 to a second value 616 over a second period of time and/or a return of the first regulation control parameter from the second value 616 to the base value 612 over a third period of time, wherein the first period of time 6009 comprises the second period of time and the third period of time. The second value 616 may be lower than the base value 612. In some embodiments, such as shown in FIG. 6, the first function may be a polynomial function, such as a cubic regression polynomial function. In some embodiments, the first profile-based knobbing cycle is completed at a second time 6003 (e.g., the second time 6003 may correspond to the end of the first period of time 6009 and/or a time at which the first regulation control parameter reaches the base value 612). In some embodiments, a second profile-based knobbing cycle of the first regulation control parameter may be triggered 608 at a third time 6005 in response to a transient event. The second profile-based knobbing cycle may start at the third time 6005. The second profile-based knobbing cycle is based upon (e.g., defined by) the first parameter modification profile. The second profile-based knobbing cycle comprises modification of the regulation control parameter, according to the first function, over a fourth period of time (wherein a duration of the fourth period of time is the same as the duration of the first period of time 6009, for example). A third profile-based knobbing cycle may be triggered 610 at a fourth time 6007 that is during the fourth period of time (e.g., the fourth time 6007 is before the second profile-based knobbing cycle is completed and/or before the regulation control parameter reaches the base value 612). The third profile-based knobbing cycle may start at the fourth time 6007. The third profile-based knobbing cycle is based upon (e.g., defined by) the first parameter modification profile. The third profile-based knobbing cycle comprises setting the first regulation control parameter to the base value 612 (e.g., modifying the first regulation control parameter from a current value when the third profile-based knobbing cycle is triggered to the base value 612) and/or modification of the regulation control parameter, according to the first function, over a fifth period of time (wherein a duration of the fifth period of time is the same as the duration of the first period of time 6009, for example).

It may be appreciated that the second value may be higher than the base value. For example, in FIG. 6, the second regulation control parameter curve 604 illustrates the first regulation control parameter according to an example scenario in which the second value (shown with reference number 620) is higher than the base value (shown with reference number 618).

Figure 7:
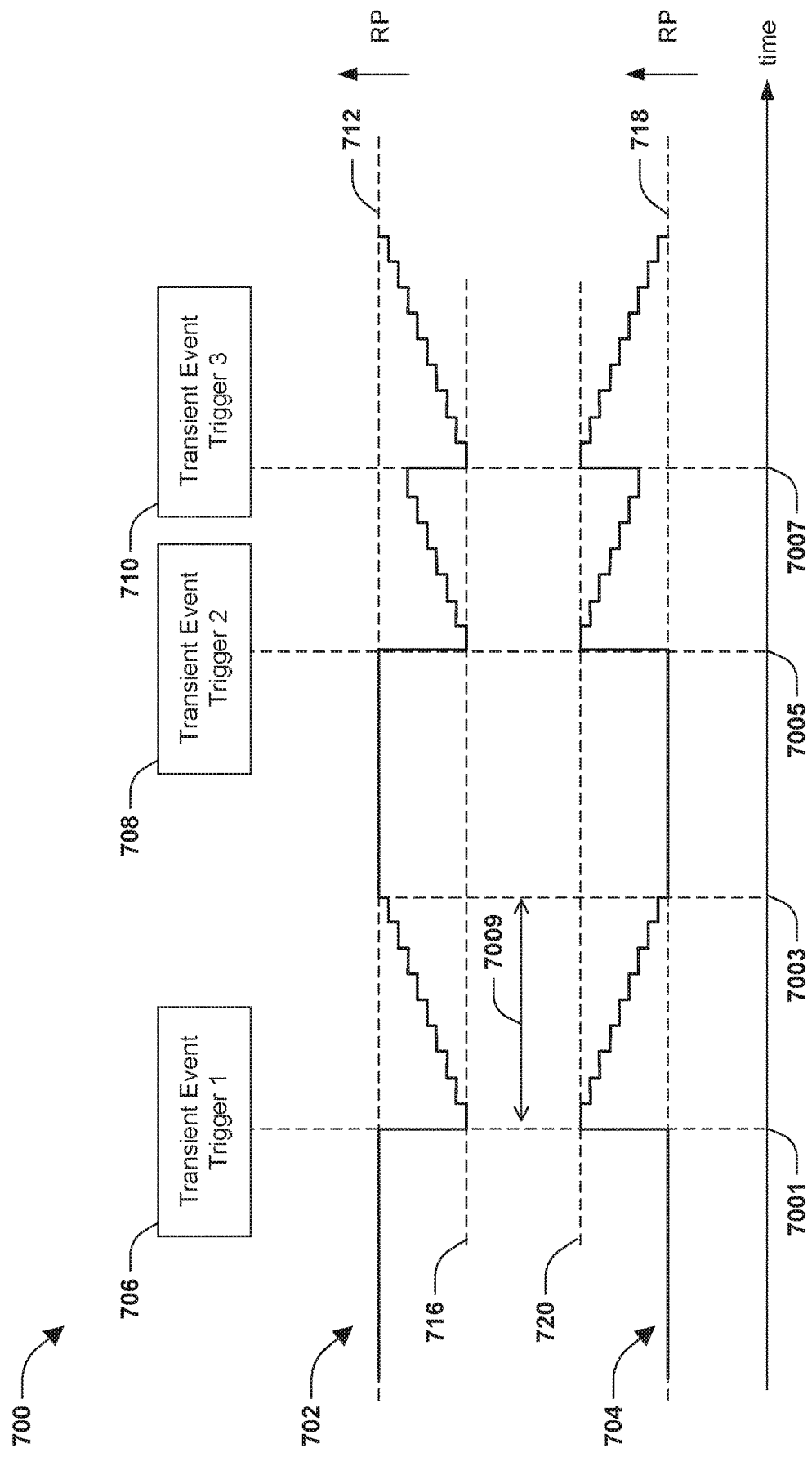
FIG. 7 is an exemplary timing diagram illustrating operation of an apparatus, according to some embodiments.

FIG. 7 illustrates a timing diagram 700 associated with operation of the apparatus 100, according to some embodiments. The timing diagram 700 comprises a first regulation control parameter curve 702 and a second regulation control parameter curve 704. A vertical axis of the first regulation control parameter curve 702 may correspond to a first regulation control parameter (e.g., a value of the first regulation control parameter) of the one or more regulation control parameters 106. A first profile-based knobbing cycle of the first regulation control parameter may be triggered 706 at a first time 7001 in response to a transient event. The first profile-based knobbing cycle may start at the first time 7001. The first profile-based knobbing cycle is based upon (e.g., defined by) a first parameter modification profile. The first profile-based knobbing cycle comprises setting the first regulation control parameter to a second value 716 (e.g., the second value 716 may be indicated by the parameter modification profile) and/or modification of the regulation control parameter, according to a first function of the first parameter modification profile, over a first period of time 7009 (wherein a duration of the first period of time 7009 is based upon the first parameter modification profile, for example). In some embodiments, the first function defines a return of the first regulation control parameter from the second value 716 to a base value 712 of the first regulation control parameter. The second value 716 may be lower than the base value 712. In some embodiments, such as shown in FIG. 7, the first function may be a step function. In some examples, vertical separation between contiguous steps of the step function may be constant throughout at least some of the first profile-based knobbing cycle. Alternatively and/or additionally, vertical separation between contiguous steps of the step function may vary throughout at least some of the first profile-based knobbing cycle. Alternatively and/or additionally, a horizontal length of steps of the step function may be constant throughout at least some of the first profile-based knobbing cycle. Alternatively and/or additionally, horizontal lengths of steps of the step function may vary throughout at least some of the first profile-based knobbing cycle. In some embodiments, such as illustrated by the first regulation control parameter curve 702, the step function may be an increasing step function. In some embodiments, the first profile-based knobbing cycle is completed at a second time 7003 (e.g., the second time 7003 may correspond to the end of the first period of time 7009 and/or a time at which the first regulation control parameter reaches the base value 712). In some embodiments, a second profile-based knobbing cycle of the first regulation control parameter may be triggered 708 at a third time 7005 in response to a transient event. The second profile-based knobbing cycle may start at the third time 7005. The second profile-based knobbing cycle is based upon (e.g., defined by) the first parameter modification profile. The second profile-based knobbing cycle comprises setting the first regulation control parameter to the second value 716 (e.g., modifying the first regulation control parameter from the base value 712 to the second value 716) and/or modification of the regulation control parameter, according to the first function, over a second period of time (wherein a duration of the second period of time is the same as the duration of the first period of time 7009, for example). A third profile-based knobbing cycle may be triggered 710 at a fourth time 7007 that is during the second period of time (e.g., the fourth time 7007 is before the second profile-based knobbing cycle is completed and/or before the regulation control parameter reaches the base value 712). The third profile-based knobbing cycle may start at the fourth time 7007. The third profile-based knobbing cycle is based upon (e.g., defined by) the first parameter modification profile. The third profile-based knobbing cycle comprises setting the first regulation control parameter to the second value 716 (e.g., modifying the first regulation control parameter from a current value when the third profile-based knobbing cycle is triggered to the second value 716) and/or modification of the regulation control parameter, according to the first function, over a third period of time (wherein a duration of the third period of time is the same as the duration of the first period of time 7009, for example).

It may be appreciated that the second value may be higher than the base value. For example, in FIG. 7, the second regulation control parameter curve 704 illustrates the first regulation control parameter according to an example scenario in which the second value (shown with reference number 720) is higher than the base value (shown with reference number 718) and the first function (e.g., the step function) of the profile modification profile is a decreasing step function.

Figure 8:
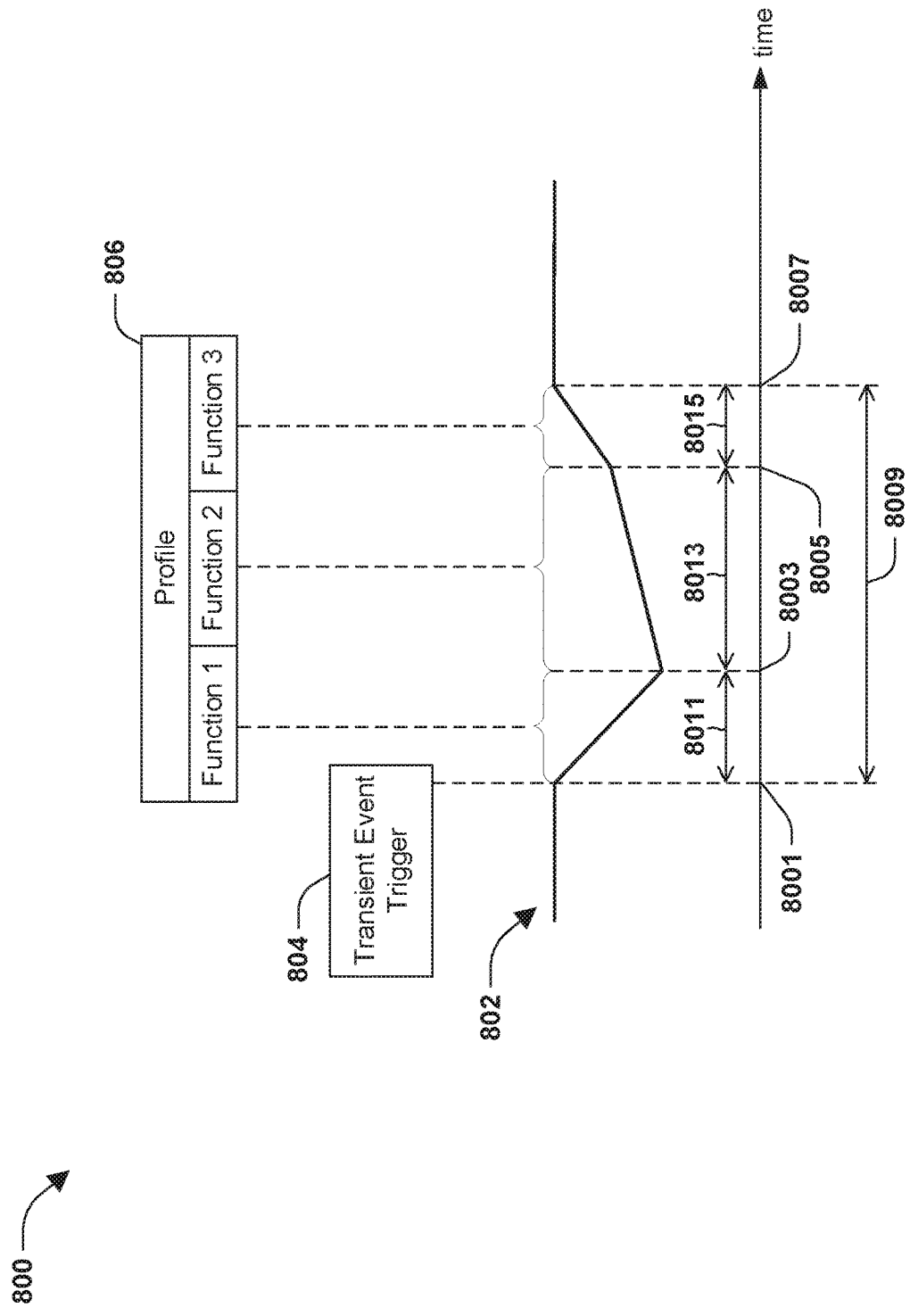
FIG. 8 is an exemplary timing diagram illustrating operation of an apparatus, according to some embodiments.

FIG. 8 illustrates a timing diagram 800 associated with operation of the apparatus 100, according to some embodiments. The timing diagram 800 comprises a regulation control parameter curve 802. A vertical axis of the regulation control parameter curve 802 may correspond to a regulation control parameter (e.g., a value of the regulation control parameter) of the one or more regulation control parameters 106. A profile-based knobbing cycle of the regulation control parameter may be triggered 804 at a first time 8001 in response to a transient event. The profile-based knobbing cycle may start at the first time 8001. The profile-based knobbing cycle is based upon (e.g., defined by) a parameter modification profile 806. The profile-based knobbing cycle comprises modification of the regulation control parameter, according to the parameter modification profile 806, over a first period of time 8009 between the first time 8001 and a fourth time 8007 (wherein a duration of the first period of time 8009 is based upon the parameter modification profile, for example).

In some examples, the parameter modification profile 806 comprises a piecewise function comprising Function 1, Function 2 and/or Function 3. A first portion of the profile-based knobbing cycle, corresponding to a first portion 8011 of the first period of time 8009, comprises modification of the regulation control parameter based upon the Function 1 (e.g., a linear function with a negative slope). The first portion 8011 of the first period of time 8009 may correspond to a period of time between the first time 8001 and a second time 8003. A second portion of the profile-based knobbing cycle, corresponding to a second portion 8013 of the first period of time 8009, comprises modification of the regulation control parameter based upon the Function 2 (e.g., a linear function with a positive slope). The second portion 8013 of the first period of time 8009 may correspond to a period of time between the second time 8003 and a third time 8005. A third portion of the profile-based knobbing cycle, corresponding to a third portion 8015 of the first period of time 8009, comprises modification of the regulation control parameter based upon the Function 3 (e.g., a linear function with a positive slope that is different than the positive slope of Function 2). The third portion 8015 of the first period of time 8009 may correspond to a period of time between the third time 8005 and the fourth time 8007.

Figure 9:
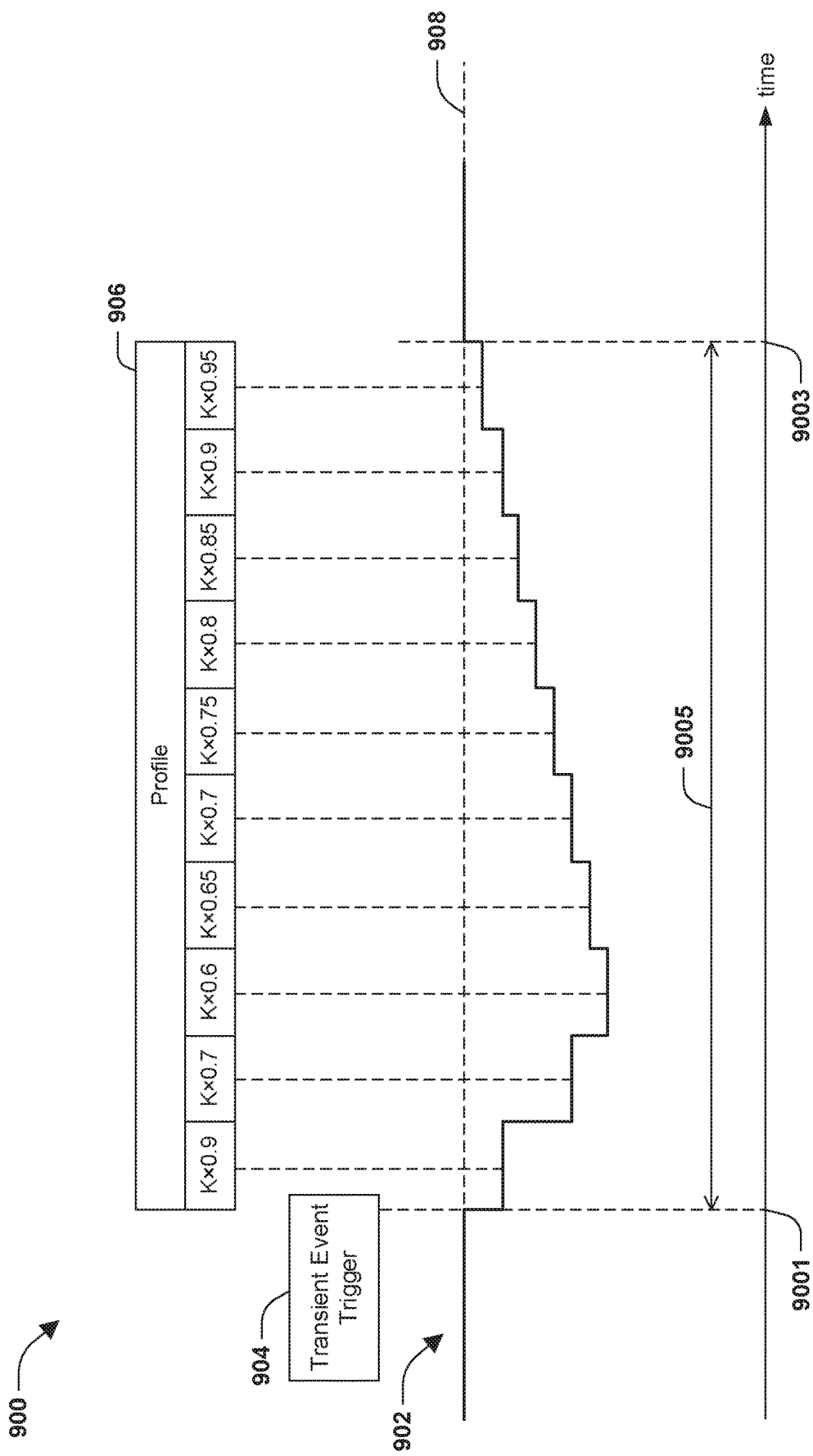
FIG. 9 is an exemplary timing diagram illustrating operation of an apparatus, according to some embodiments.

FIG. 9 illustrates a timing diagram 900 associated with operation of the apparatus 100, according to some embodiments. The timing diagram 900 comprises a regulation control parameter curve 902. A vertical axis of the regulation control parameter curve 902 may correspond to a regulation control parameter (e.g., a value of the regulation control parameter) of the one or more regulation control parameters 106. A profile-based knobbing cycle of the regulation control parameter may be triggered 904 at a first time 9001 in response to a transient event. The profile-based knobbing cycle may start at the first time 9001. The profile-based knobbing cycle is based upon (e.g., defined by) a parameter modification profile 906. The profile-based knobbing cycle comprises modification of the regulation control parameter, according to the parameter modification profile 906, over a first period of time 9005 between the first time 9001 and a second time 9003 (wherein a duration of the first period of time 9005 is based upon the parameter modification profile, for example).

In some examples, the parameter modification profile 906 comprises a step function. For example, the parameter modification profile 906 may comprise values of the step function (e.g., a look-up table of values). The profile-based knobbing cycle may comprise setting the regulation control parameter to one or more values of the step function during the first period of time 9005. In an example, a starting value of the profile-based knobbing cycle may be K×0.9, wherein K may correspond to a base value 908 of the regulation control parameter. In an example where the regulation control parameter is equal to the base value 908 when the profile-based knobbing cycle is triggered 904, the profile-based knobbing cycle may comprise modification of the regulation control parameter from the base value 908 to the starting value (e.g., K×0.9), followed by setting the regulation control parameter to other values of the step function (e.g., setting the regulation control parameter to K×0.7, followed by setting the regulation control parameter to K×0.6, followed by setting the regulation control parameter to K×0.65, etc.). In some examples, at the end of the profile-based knobbing cycle, the regulation control parameter returns to being equal to the base value 908.

In some embodiments, different modification profiles may be associated with (e.g., assigned to) different regulation control parameters. For example, a first parameter modification profile may be associated with (e.g., assigned to) one or more third regulation control parameters and/or a second parameter modification profile may be associated with (e.g., assigned to) one or more fourth regulation control parameters. For example, in response to transient events, the parameter control system may modify the one or more third regulation control parameters in accordance with the first parameter modification profile. Alternatively and/or additionally, in response to transient events, the parameter control system may modify the one or more fourth regulation control parameters in accordance with the second parameter modification profile. Examples are shown in FIG. 10.

Figure 10:
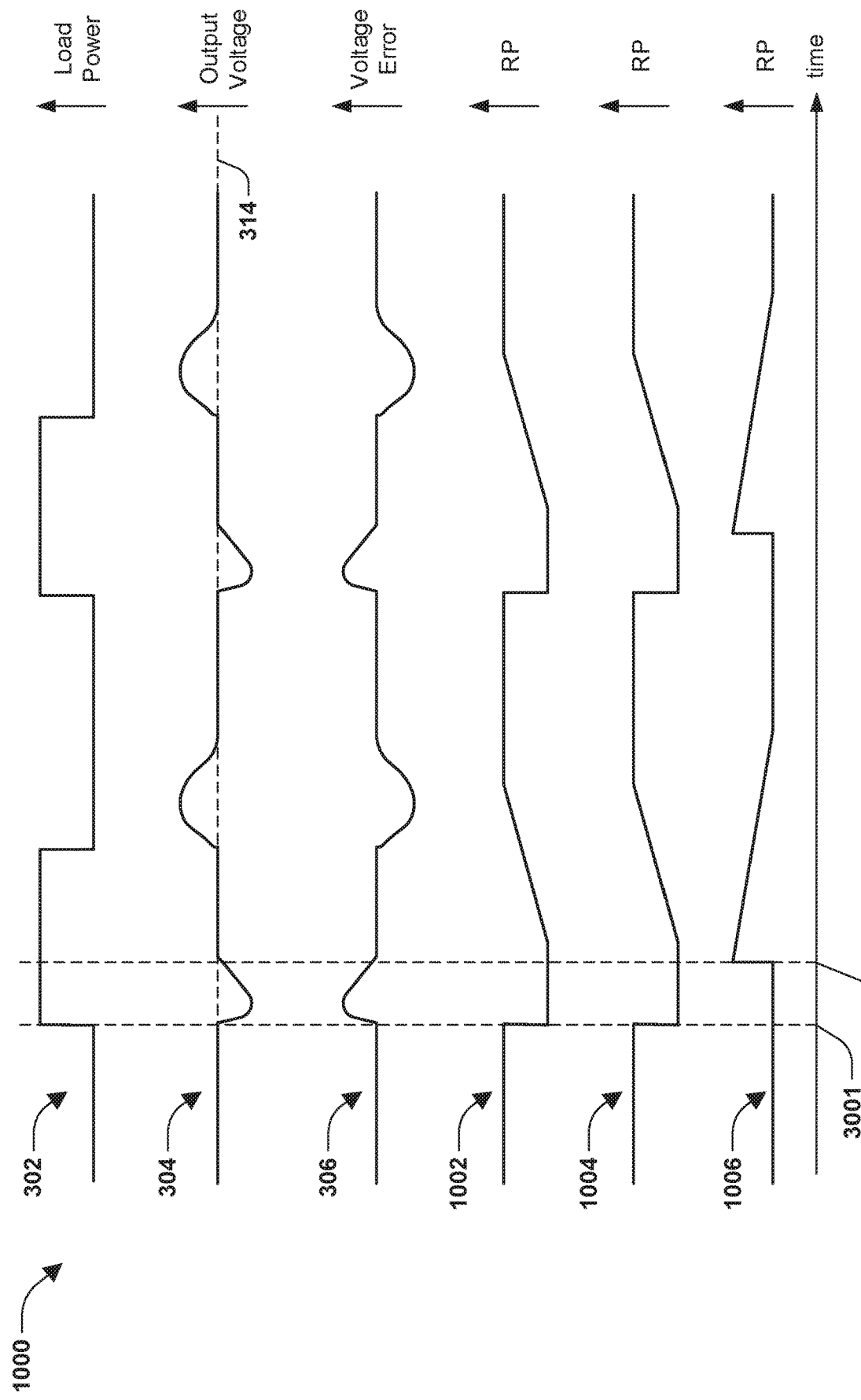
FIG. 10 is an exemplary timing diagram illustrating operation of an apparatus, according to some embodiments.

FIG. 10 illustrates a timing diagram 1000 associated with operation of the apparatus 100, according to some embodiments. The timing diagram 1000 comprises the load curve 302 (shown and described with respect to FIG. 3), the output voltage curve 304 (shown and described with respect to FIG. 3), the voltage error curve 306 (shown and described with respect to FIG. 3), a first regulation control parameter curve 1002, a second regulation control parameter curve 1004 and/or a third regulation control parameter curve 1006. A vertical axis of the first regulation control parameter curve 1002 may correspond to a first regulation control parameter (e.g., a value of the first regulation control parameter) of the one or more regulation control parameters 106. A vertical axis of the second regulation control parameter curve 1004 may correspond to a second regulation control parameter (e.g., a value of the second regulation control parameter) of the one or more regulation control parameters 106. A vertical axis of the third regulation control parameter curve 1006 may correspond to a third regulation control parameter (e.g., a value of the third regulation control parameter) of the one or more regulation control parameters 106. In an example, the one or more third regulation control parameters (modified based upon the first parameter modification profile, for example) may comprise the first regulation control parameter and the second regulation control parameter. The one or more fourth regulation control parameters (modified based upon the second parameter modification profile, for example) may comprise the third regulation control parameter. Thus, modification to the first regulation control parameter and modification to the second regulation control parameter may both be based upon the first parameter modification profile. Alternatively and/or additionally, modification to the third regulation control parameter may be based upon the second parameter modification profile different than the first modification profile. In an example shown in FIG. 10, profile-based knobbing cycles of the first regulation control parameter and the second regulation control parameter may be triggered and/or started at a time that is different than a time at which a profile-based knobbing cycle of the third regulation control parameter is triggered and/or started. For example, the profile-based knobbing cycles of the first regulation control parameter and the second regulation control parameter may be triggered and/or started at the first time 3001 (such as in response to the load step 308 and/or a start of the under-voltage event) and/or the profile-based knobbing cycle of the third regulation control parameter may be triggered and/or started at the second time 3003 (such as in response to an end of the under-voltage event).

Figure 11:
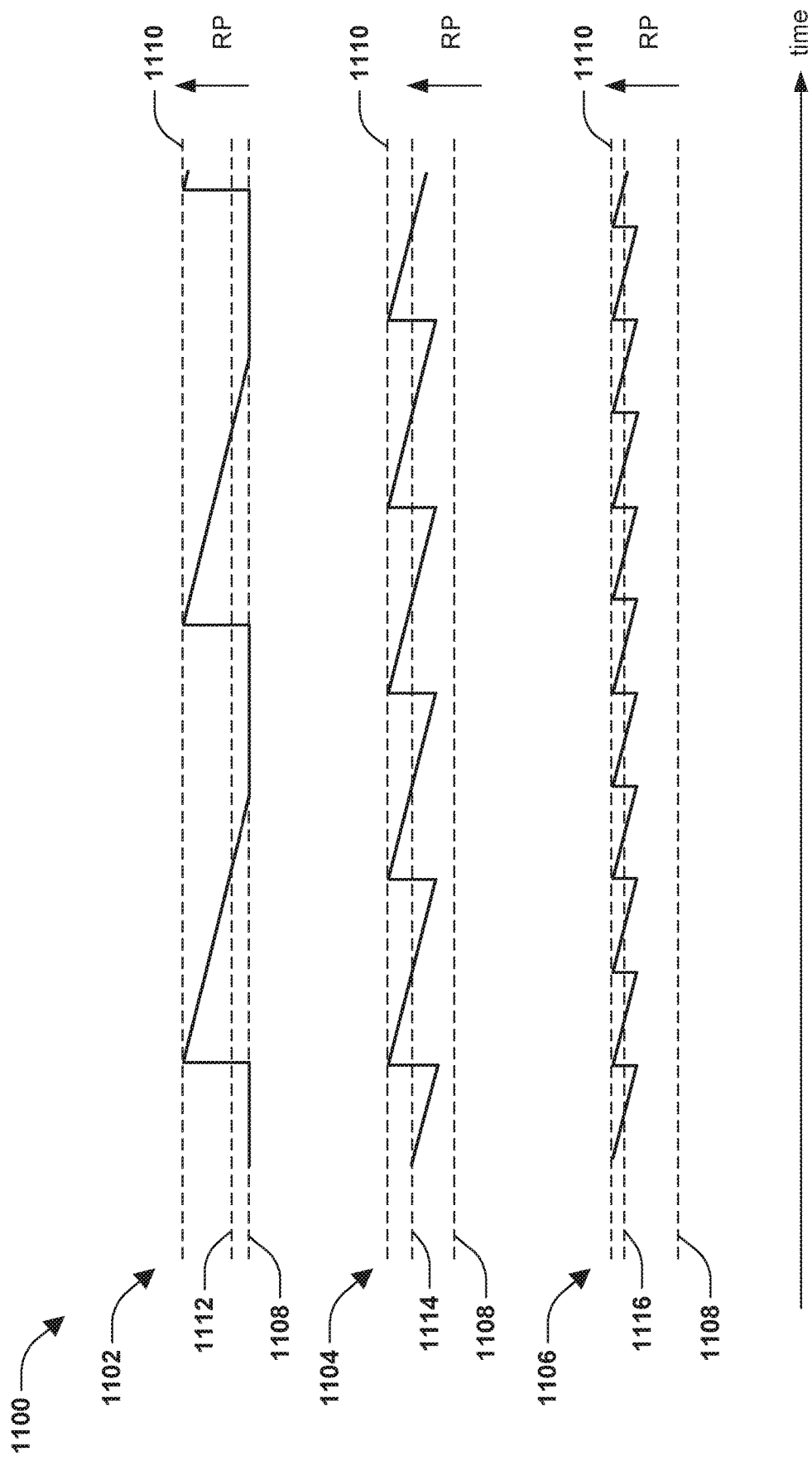
FIG. 11 is an exemplary timing diagram illustrating operation of an apparatus, according to some embodiments.

FIG. 11 illustrates a timing diagram 1100 associated with operation of the apparatus 100, according to some embodiments. The timing diagram 1100 comprises a first regulation control parameter curve 1102, a second regulation control parameter curve 1104 and/or a third regulation control parameter curve 1106. Vertical axes of the first regulation control parameter curve 1102, the second regulation control parameter curve 1104 and/or the third regulation control parameter curve 1106 may correspond to a first regulation control parameter (e.g., a value of the first regulation control parameter) of the one or more regulation control parameters 106. Profile-based knobbing cycles of the first regulation control parameter may be triggered in response to transient events. The profile-based knobbing cycles of the first regulation control parameter are based upon (e.g., defined by) a first parameter modification profile. A profile-based knobbing cycle of the first regulation control parameter comprises setting the first regulation control parameter to a second value 1110 (e.g., the second value 1110 may be indicated by the parameter modification profile) and/or modification of the regulation control parameter, according to a first function of the first parameter modification profile, over a period of time (wherein a duration of the period of time is based upon the first parameter modification profile, for example). In some embodiments, the first function defines a return of the first regulation control parameter from the second value 1110 to a base value 1108 of the first regulation control parameter. In an example of FIG. 11, the second value 1110 may be higher than the base value 1108. In some embodiments, such as shown in FIG. 11, the first function may be a linear function corresponding to a linear return of the first regulation control parameter from the second value 1110 to the base value 1108.

The first regulation control parameter curve 1102 shows the first regulation control parameter during a time in which transient events (in response to which profile-based knobbing cycles of the first regulation control parameter are triggered) occur at a first transient event frequency. The second regulation control parameter curve 1104 shows the first regulation control parameter during a time in which transient events (in response to which profile-based knobbing cycles of the first regulation control parameter are triggered) occur at a second transient event frequency higher than the first transient event frequency. The third regulation control parameter curve 1106 shows the first regulation control parameter during a time in which transient events (in response to which profile-based knobbing cycles of the first regulation control parameter are triggered) occur at a third transient event frequency higher than the second transient event frequency.

As shown by the timing diagram 1100 of FIG. 11, an average value of the first regulation pattern over time varies across different transient event frequencies. For example, as shown by the first regulation control parameter curve 1102, the first regulation control parameter has a first average value 1112 when transient events occur at the first transient event frequency. Alternatively and/or additionally, as shown by the second regulation control parameter curve 1104, the first regulation control parameter has a second average value 1114 when transient events occur at the second transient event frequency. The second average value 1114 is closer to the second value 1110 than the first average value 1112 (such as due to the second transient event frequency being higher than the first transient event frequency). Alternatively and/or additionally, as shown by the third regulation control parameter curve 1106, the first regulation control parameter has a third average value 1116 when transient events occur at the third transient event frequency. The third average value 1116 is closer to the second value 1110 than the second average value 1114 (such as due to the third transient event frequency being higher than the second transient event frequency).

In some examples, the first modification profile associated with the first regulation control parameter, such as the second value and/or the first function, may impact an average value of the first regulation control parameter at a transient event frequency (such as the first average value 1112 at the first transient event frequency, the second average value 1114 at the second transient event frequency and/or the third average value 1116 at the third transient event frequency). For example, the second value and/or the first function of the first modification profile may be configured such that the average value of the first regulation control parameter is about equal to desired values for various transient event frequencies. In an example where the first function is a linear function such as shown in FIG. 11, a slope of the linear function (e.g., a rate at which the first regulation control parameter returns to the base value 1108 in a profile-based knobbing cycle of the first regulation control parameter) may impact an average value of the first regulation control parameter at a transient event frequency, and thus, the slope may be configured such that the average value of the first regulation control parameter is about equal to desired values for various transient event frequencies. In examples in which the first function is not a linear function, such as where the first function is a step function (such as shown in FIG. 7), a rate at which the step function increases or decreases (e.g., a rate at which the first regulation control parameter returns to the base value 1108 in a profile-based knobbing cycle of the first regulation control parameter) may impact an average value of the first regulation control parameter at a transient event frequency, and thus, the rate may be configured such that the average value of the first regulation control parameter is about equal to desired values for various transient event frequencies.

Figure 12:
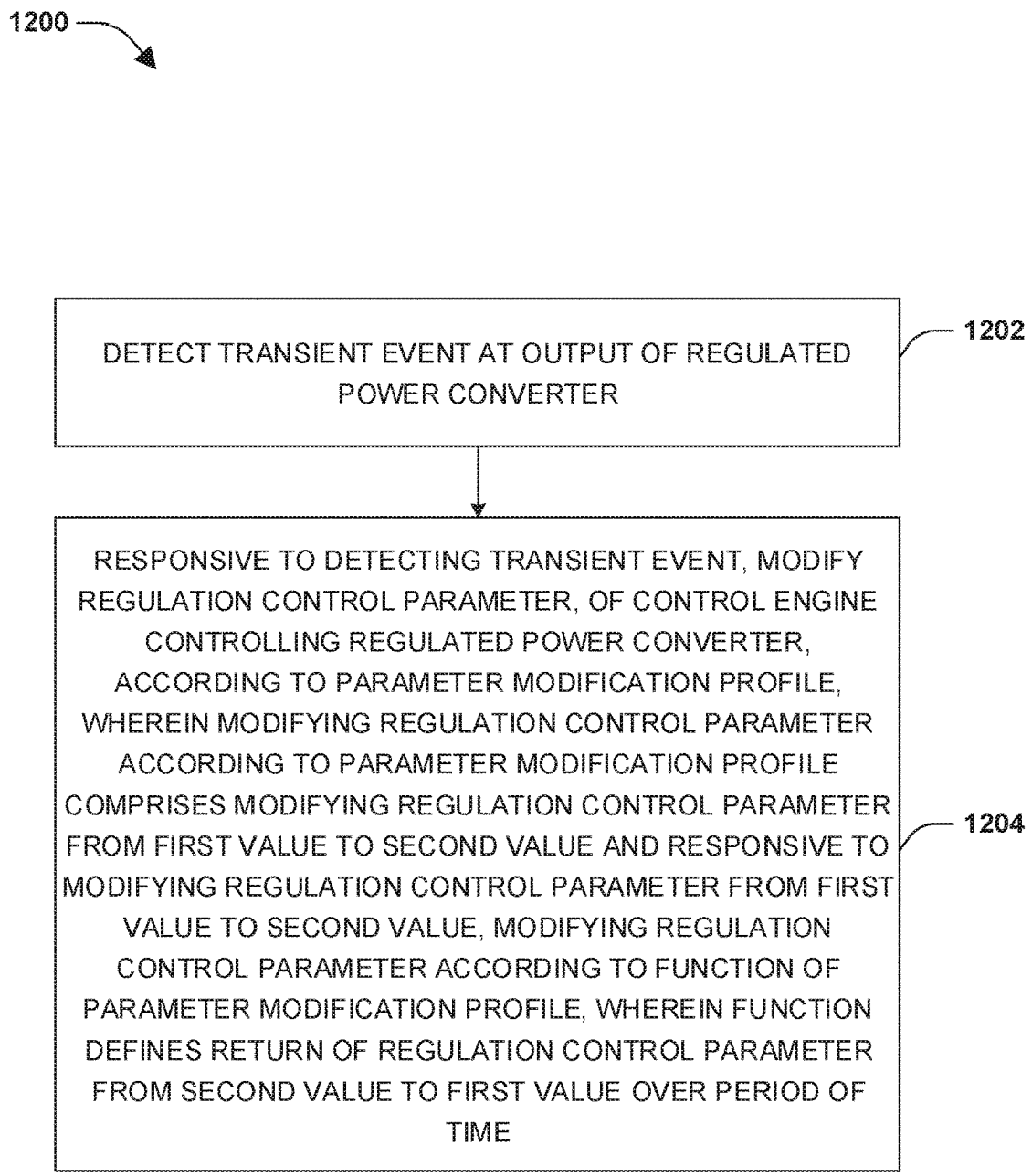
FIG. 12 is an illustration of an example method according to some embodiments.

FIG. 12 is an illustration of a method 1200, according to some embodiments. At 1202, a transient event at an output (e.g., the output 112 illustrated in FIGS. 1-2) of a regulated power converter (e.g., the regulated power converter 110 illustrated in FIGS. 1-2) is detected. At 1204, in response to detecting the transient event, a regulation control parameter of a control engine (e.g., the control engine 104 illustrated in FIGS. 1-2) may be modified according to a parameter modification profile. The control engine may control the regulated power converter. Modification of the regulation control parameter according to the parameter modification profile comprises modifying the regulation control parameter from a first value (e.g., a base value) to a second value, and/or in response to modifying the regulation control parameter from the first value to the second value, modifying the regulation control parameter according to a function of the parameter modification profile, wherein the function defines a return of the regulation control parameter from the second value to the first value over a period of time.

In some embodiments, a second transient event at the output of the regulated power converter is detected. The second transient event may occur during the period of time. In response to detecting the second transient event, the regulation control parameter may be modified, during the period of time, from a current value to the second value based upon the parameter modification profile. In response to modifying the regulation control parameter from the current value to the second value during the period of time, the regulation control parameter may be modified according to the function of the parameter modification profile.

In some embodiments, the function is a linear function (such as illustrated in FIG. 5). The modifying the regulation control parameter according to the function may comprise modifying the regulation control parameter from the second value to the first value over the period of time according to the linear function.

In some embodiments, the function is a piecewise function (such as illustrated in FIGS. 7-9). The modifying the regulation control parameter according to the function may comprise modifying the regulation control parameter from the second value to the first value over the period of time according to the piecewise function.

In some embodiments, the function is a step function (such as illustrated in FIG. 7 and FIG. 9). The modifying the regulation control parameter according to the function may comprise modifying the regulation control parameter from the second value to the first value over the period of time according to the step function. In some embodiments, the modifying the regulation control parameter from the second value to the first value over the period of time comprises setting the regulation control parameter to values of the step function during the period of time (e.g., values of the parameter modification profile 906 shown in FIG. 9).

In some embodiments, the transient event corresponds to a current increase at the output of the regulated power converter, an under-voltage event at the output of the regulated power converter, a current decrease at the output of the regulated power converter and/or an over-voltage event at the output of the regulated power converter.

In some embodiments, the first parameter is a non-linear gain parameter of the control engine, a PID parameter of a PID controller of the control engine, an AVP droop level of an AVP controller (e.g., the AVP controller 248 illustrated in FIG. 2) of the control engine, an AVP bandwidth of an AVP filtering module (e.g., the AVP filtering module 242 illustrated in FIG. 2) of the control engine, an output voltage offset, or an inductor current synthesis parameter of a current monitor (e.g., the current monitor 258 illustrated in FIG. 2) of the control engine.

In some embodiments, in response to detecting the transient event, a second regulation control parameter of the control engine may be modified according to the parameter modification profile.

In some embodiments, in response to detecting the transient event, a third regulation control parameter of the control engine may be modified according to a second parameter modification profile different than the parameter modification profile.

An embodiment of the presently disclosed techniques includes a method. The method includes detecting a transient event at an output of a regulated power converter; in response to detecting the transient event, modifying a regulation control parameter, of a control engine controlling the regulated power converter, according to a parameter modification profile, wherein the modifying the regulation control parameter according to the parameter modification profile includes: modifying the regulation control parameter from a first value to a second value; and responsive to modifying the regulation control parameter from the first value to the second value, modifying the regulation control parameter according to a function of the parameter modification profile, wherein the function defines a return of the regulation control parameter from the second value to the first value over a period of time.

According to some embodiments, the method includes detecting a second transient event at the output of the regulated power converter, wherein the second transient event occurs during the period of time; responsive to detecting the second transient event, modifying, during the period of time, the regulation control parameter from a current value to the second value based upon the parameter modification profile; and responsive to modifying the regulation control parameter from the current value to the second value during the period of time, modifying anew the regulation control parameter according to the function of the parameter modification profile.

According to some embodiments, the function is a linear function; and the modifying the regulation control parameter according to the function includes modifying the regulation control parameter from the second value to the first value over the period of time according to the linear function.

According to some embodiments, the function is a piecewise function; and the modifying the regulation control parameter according to the function includes modifying the regulation control parameter from the second value to the first value over the period of time according to the piecewise function.

According to some embodiments, the function is a step function; and the modifying the regulation control parameter according to the function includes modifying the regulation control parameter from the second value to the first value over the period of time according to the step function.

According to some embodiments, the modifying the regulation control parameter from the second value to the first value over the period of time includes setting the regulation control parameter to values of the step function during the period of time.

According to some embodiments, the transient event corresponds to a current increase at the output of the regulated power converter; an under-voltage event at the output of the regulated power converter; a current decrease at the output of the regulated power converter; and/or an over-voltage event at the output of the regulated power converter.

According to some embodiments, the first parameter is a non-linear gain parameter of the control engine; a PID parameter of a PID controller of the control engine; an AVP droop level of an AVP controller of the control engine; an AVP bandwidth of an AVP filtering module of the control engine; an output voltage offset; or an inductor current synthesis parameter of a current monitor of the control engine.

According to some embodiments, the method includes in response to detecting the transient event, modifying a second regulation control parameter of the control engine according to the parameter modification profile.

According to some embodiments, the method includes in response to detecting the transient event, modifying a second regulation control parameter of the control engine according to a second parameter modification profile different than the parameter modification profile.

An embodiment of the presently disclosed techniques includes an apparatus. The apparatus includes a means for detecting a transient event at an output of a regulated power converter; and a means for modifying a regulation control parameter, of a control engine controlling the regulated power converter, according to a parameter modification profile. The modifying the regulation control parameter according to the parameter modification profile is performed in response to detecting the transient event. The modifying the regulation control parameter according to the parameter modification profile includes modifying the regulation control parameter from a first value to a second value, and in response to modifying the regulation control parameter from the first value to the second value, modifying the regulation control parameter according to a function of the parameter modification profile, wherein the function defines a return of the regulation control parameter from the second value to the first value over a period of time.

An embodiment of the presently disclosed techniques includes an apparatus. The apparatus includes a regulated power converter; a control engine configured to control the regulated power converter based upon a regulation control parameter; and a parameter control system configured to: detect a transient event at an output of the regulated power converter; responsive to the transient event, modify the regulation control parameter from a first value to a second value based upon a parameter modification profile; and responsive to modifying the regulation control parameter from the first value to the second value, modify the regulation control parameter according to a function of the parameter modification profile, wherein the function defines a return of the regulation control parameter from the second value to the first value over a period of time.

According to some embodiments, the control engine is configured to output, based upon the regulation control parameter, a set of PWM signals to the regulated power converter; and a voltage at the output of the regulated power converter is based upon the set of PWM signals.

According to some embodiments, the control engine is a multi-phase buck control engine; and each PWM signal of the set of PWM signals is associated with a phase of a set of phases associated with the multi-phase buck control engine.

According to some embodiments, the control engine is configured to output the set of PWM signals based upon a target voltage associated with the output of the regulated power converter and at least one of the voltage at the output of the regulated power converter or a current at the output of the regulated power converter.

According to some embodiments, the parameter control system is configured to detect a second transient event at the output of the regulated power converter, wherein the second transient event occurs during the period of time; responsive to the second transient event, modify, during the period of time, the regulation control parameter from a current value to the second value based upon the parameter modification profile; and responsive to modifying the regulation control parameter from the current value to the second value during the period of time, modify anew the regulation control parameter according to the function of the parameter modification profile.

According to some embodiments, the apparatus includes a capacitor connected to the output of the regulated power converter, wherein the transient event corresponds to a current increase at the output of the regulated power converter; an under-voltage event of the capacitor; a current decrease at the output of the regulated power converter; and/or an over-voltage event of the capacitor.

An embodiment of the presently disclosed techniques includes an apparatus. The apparatus includes a circuit board; a regulated power converter operatively coupled to the circuit board; a control engine operatively coupled to the circuit board, wherein the control engine is configured to control the regulated power converter based upon a regulation control parameter; and a parameter control system operatively coupled to the circuit board, wherein the parameter control system is configured to: detect a transient event at an output of the regulated power converter; responsive to the transient event, modify the regulation control parameter from a first value to a second value based upon a parameter modification profile; and responsive to modifying the regulation control parameter from the first value to the second value, modify the regulation control parameter according to a function of the parameter modification profile, wherein the function defines a return of the regulation control parameter from the second value to the first value over a period of time.

According to some embodiments, the output of the regulated power converter is connected to a load.

According to some embodiments, the load is operatively coupled to the circuit board.

According to some embodiments, the parameter control system is configured to detect a second transient event at the output of the regulated power converter, wherein the second transient event occurs during the period of time; responsive to the second transient event, modify, during the period of time, the regulation control parameter from a current value to the second value based upon the parameter modification profile; and responsive to modifying the regulation control parameter from the current value to the second value during the period of time, modify anew the regulation control parameter according to the function of the parameter modification profile.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method, comprising:
    detecting a transient event at an output of a regulated power converter; and
    responsive to detecting the transient event, modifying a regulation control parameter, of a control engine generating a control signal to control the regulated power converter, according to a parameter modification profile, wherein the modifying the regulation control parameter of the control engine according to the parameter modification profile comprises:
        modifying the regulation control parameter of the control engine from a first value to a second value; and
        responsive to modifying the regulation control parameter of the control engine from the first value to the second value, modifying the regulation control parameter of the control engine according to a function of the parameter modification profile, wherein the function defines a return of the regulation control parameter of the control engine from the second value to the first value over a period of time.

2. The method of claim 1, comprising:
    detecting a second transient event at the output of the regulated power converter, wherein the second transient event occurs during the period of time;
    responsive to detecting the second transient event, modifying, during the period of time, the regulation control parameter of the control engine from a current value to the second value based upon the parameter modification profile; and
    responsive to modifying the regulation control parameter of the control engine from the current value to the second value during the period of time, modifying anew the regulation control parameter of the control engine according to the function of the parameter modification profile.

3. The method of claim 1, wherein:
    the function is a linear function; and
    the modifying the regulation control parameter of the control engine according to the function comprises modifying the regulation control parameter of the control engine from the second value to the first value over the period of time according to the linear function.

4. The method of claim 1, wherein:
    the function is a piecewise function; and
    the modifying the regulation control parameter of the control engine according to the function comprises modifying the regulation control parameter of the control engine from the second value to the first value over the period of time according to the piecewise function.

5. The method of claim 1, wherein:
    the function is a step function; and
    the modifying the regulation control parameter of the control engine according to the function comprises modifying the regulation control parameter of the control engine from the second value to the first value over the period of time according to the step function.

6. The method of claim 5, wherein:
    the modifying the regulation control parameter of the control engine from the second value to the first value over the period of time comprises setting the regulation control parameter of the control engine to values of the step function during the period of time.

7. The method of claim 1, wherein the transient event corresponds to at least one of:
    a current increase at the output of the regulated power converter;
    an under-voltage event at the output of the regulated power converter;
    a current decrease at the output of the regulated power converter; or
    an over-voltage event at the output of the regulated power converter.

8. The method of claim 1, wherein the regulation control parameter is:
    a non-linear gain parameter of the control engine;
    a proportional integral derivative (PID) parameter of a PID controller of the control engine;
    an adaptive voltage positioning (AVP) droop level of an AVP controller of the control engine;
    an AVP bandwidth of an AVP filtering module of the control engine;
    an output voltage offset; or
    an inductor current synthesis parameter of a current monitor of the control engine.

9. The method of claim 1, comprising:
    responsive to detecting the transient event, modifying a second regulation control parameter of the control engine according to the parameter modification profile.

10. The method of claim 1, comprising:
responsive to detecting the transient event, modifying a second regulation control parameter of the control engine according to a second parameter modification profile different than the parameter modification profile.

11. An apparatus comprising:
a regulated power converter;
a control engine configured to generate a control signal to control the regulated power converter based upon a regulation control parameter of the control engine; and
a parameter control system configured to:
detect a transient event at an output of the regulated power converter;
responsive to the transient event, modify the regulation control parameter of the control engine from a first value to a second value based upon a parameter modification profile; and
responsive to modifying the regulation control parameter of the control engine from the first value to the second value, modify the regulation control parameter of the control engine according to a function of the parameter modification profile, wherein the function defines a return of the regulation control parameter of the control engine from the second value to the first value over a period of time.

12. The apparatus of claim 11, wherein:
the control engine is configured to output, based upon the regulation control parameter of the control engine, a set of pulse width modulation (PWM) signals to the regulated power converter; and
a voltage at the output of the regulated power converter is based upon the set of PWM signals.

13. The apparatus of claim 12, wherein:
the control engine is a multi-phase buck control engine; and
each PWM signal of the set of PWM signals is associated with a phase of a set of phases associated with the multi-phase buck control engine.

14. The apparatus of claim 12, wherein:
the control engine is configured to output the set of PWM signals based upon:
a target voltage associated with the output of the regulated power converter; and
at least one of:
the voltage at the output of the regulated power converter; or
a current at the output of the regulated power converter.

15. The apparatus of claim 11, wherein the parameter control system is configured to:
detect a second transient event at the output of the regulated power converter, wherein the second transient event occurs during the period of time;
responsive to the second transient event, modify, during the period of time, the regulation control parameter of the control engine from a current value to the second value based upon the parameter modification profile; and
responsive to modifying the regulation control parameter of the control engine from the current value to the second value during the period of time, modify anew the regulation control parameter of the control engine according to the function of the parameter modification profile.

16. The apparatus of claim 11, comprising:
a capacitor connected to the output of the regulated power converter, wherein the transient event corresponds to at least one of:
a current increase at the output of the regulated power converter;
an under-voltage event of the capacitor;
a current decrease at the output of the regulated power converter; or
an over-voltage event of the capacitor.

17. An apparatus comprising:
a circuit board;
a regulated power converter operatively coupled to the circuit board;
a control engine operatively coupled to the circuit board, wherein the control engine is configured to generate a control signal to control the regulated power converter based upon a regulation control parameter of the control engine; and
a parameter control system operatively coupled to the circuit board, wherein the parameter control system is configured to:
detect a transient event at an output of the regulated power converter;
responsive to the transient event, modify the regulation control parameter of the control engine from a first value to a second value based upon a parameter modification profile; and
responsive to modifying the regulation control parameter of the control engine from the first value to the second value, modify the regulation control parameter of the control engine according to a function of the parameter modification profile, wherein the function defines a return of the regulation control parameter of the control engine from the second value to the first value over a period of time.

18. The apparatus of claim 17, wherein:
the output of the regulated power converter is connected to a load.

19. The apparatus of claim 18, wherein:
the load is operatively coupled to the circuit board.

20. The apparatus of claim 17, wherein the parameter control system is configured to:
detect a second transient event at the output of the regulated power converter, wherein the second transient event occurs during the period of time;
responsive to the second transient event, modify, during the period of time, the regulation control parameter of the control engine from a current value to the second value based upon the parameter modification profile; and
responsive to modifying the regulation control parameter of the control engine from the current value to the second value during the period of time, modify anew the regulation control parameter of the control engine according to the function of the parameter modification profile.

* * * * *